US009727150B2

(12) United States Patent
Stern

(10) Patent No.: US 9,727,150 B2
(45) Date of Patent: *Aug. 8, 2017

(54) PRESSURE SENSITIVE STYLUS FOR A DIGITIZER

(71) Applicant: Microsoft Technology Licensing, LLC, Redmond, WA (US)

(72) Inventor: Yuval Stern, Even-Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,517

(22) Filed: Oct. 27, 2016

(65) Prior Publication Data

US 2017/0045961 A1  Feb. 16, 2017

Related U.S. Application Data

(63) Continuation of application No. 14/451,448, filed on Aug. 5, 2014, now Pat. No. 9,513,721, which is a (Continued)

(51) Int. Cl.
*G06F 3/0354* (2013.01)
*G06F 3/044* (2006.01)
(Continued)

(52) U.S. Cl.
CPC ........ *G06F 3/03545* (2013.01); *G06F 3/0383* (2013.01); *G06F 3/041* (2013.01);
(Continued)

(58) Field of Classification Search
CPC .... G06F 3/03545; G06F 3/042; G06F 3/0414; G06F 3/044; G06F 3/0383; G06F 2203/04101
See application file for complete search history.

(56) References Cited

U.S. PATENT DOCUMENTS

| 4,111,052 A | 9/1978 | Sniderman |
| 4,451,698 A | 5/1984 | Whetstone et al. |

(Continued)

FOREIGN PATENT DOCUMENTS

| EP | 0209467 | 1/1987 |
| EP | 2818981 | 12/2004 |

(Continued)

OTHER PUBLICATIONS

International Search Report and the Written Opinion Dated Nov. 21, 2016 From the International Searching Authority Re. Application No. PCT/US2016/045661. (13 Pages).

(Continued)

*Primary Examiner* — Shaheda Abdin
(74) *Attorney, Agent, or Firm* — Miia Kati Janette Sula; Sergey Lamansky; Micky Minhas

(57) ABSTRACT

A pressure sensitive stylus for operation with a digitizer sensor includes a housing, a writing tip that is movable in response to contact pressure applied on the writing tip, an extremity that is movable together with the writing tip, a switch and an elastomer element positioned around the extremity and in physical contact with at least one of the housing or an element that is fixed to the housing. The switch includes a first element that is fixedly positioned around the extremity and a second element that is fixed to the housing, wherein physical contact between the first element and the second element closes the switch. The writing tip is operable to move in response to the elastomer element compressing against the housing or an element that is fixed to the housing and the switch is operative to toggle at a pre-defined compressed state of the elastomer element.

20 Claims, 16 Drawing Sheets

Related U.S. Application Data continuation-in-part of application No. 61/876,888, filed on Sep. 12, 2013.

(51) Int. Cl.
*G06F 3/038* (2013.01)
*G06F 3/041* (2006.01)

(52) U.S. Cl.
CPC .... *G06F 3/044* (2013.01); *G06F 2203/04101* (2013.01); *G06F 2203/04105* (2013.01)

(56) References Cited

U.S. PATENT DOCUMENTS

| | | | |
|---|---|---|---|
| 4,672,154 | A | 6/1987 | Rodgers et al. |
| 5,004,872 | A | 4/1991 | Lasley |
| 5,138,118 | A | 8/1992 | Russell |
| 5,225,637 | A | 7/1993 | Rodgers et al. |
| 5,414,227 | A | 5/1995 | Schubert et al. |
| 5,528,002 | A | 6/1996 | Katabami |
| 5,565,632 | A | 10/1996 | Ogawa |
| 5,571,997 | A | 11/1996 | Gray et al. |
| 5,576,502 | A | 11/1996 | Fukushima et al. |
| 5,581,052 | A | 12/1996 | Padula et al. |
| 5,793,360 | A | 8/1998 | Fleck et al. |
| 5,914,708 | A | 6/1999 | LaGrange et al. |
| 6,104,388 | A | 8/2000 | Nagai et al. |
| 6,175,773 | B1 | 1/2001 | Reiffel et al. |
| 6,211,863 | B1 | 4/2001 | Chery et al. |
| 6,232,962 | B1 | 5/2001 | Davis et al. |
| 6,249,234 | B1 | 6/2001 | Ely et al. |
| 6,344,656 | B1 | 2/2002 | Hopkins et al. |
| 6,474,888 | B1 | 11/2002 | Lapstun et al. |
| 6,624,832 | B1 | 9/2003 | Thomas |
| 6,690,156 | B1 | 2/2004 | Weiner et al. |
| 6,707,451 | B1 | 3/2004 | Nagaoka |
| 6,727,439 | B2 | 4/2004 | Chao et al. |
| 6,853,369 | B2 | 2/2005 | Fukushima et al. |
| 6,972,754 | B2 | 12/2005 | Zank |
| 7,145,555 | B2 | 12/2006 | Taylor et al. |
| 7,202,862 | B1 | 4/2007 | Palay et al. |
| 7,210,046 | B2 | 4/2007 | Truong |
| 7,279,646 | B2 | 10/2007 | Xu |
| 7,292,229 | B2 | 11/2007 | Morag et al. |
| 7,367,242 | B2 | 5/2008 | Xi et al. |
| 7,372,455 | B2 | 5/2008 | Perski et al. |
| 7,436,397 | B2 | 10/2008 | Zank |
| 7,778,795 | B2 | 8/2010 | Fukushima et al. |
| 7,843,439 | B2 | 11/2010 | Perski et al. |
| 7,955,017 | B2 | 6/2011 | Lapstun et al. |
| 8,199,132 | B1 | 6/2012 | Oda et al. |
| 8,212,795 | B2 | 7/2012 | Henry |
| 8,228,299 | B1 | 7/2012 | Maloney et al. |
| 8,481,872 | B2 | 7/2013 | Zachut |
| 8,536,471 | B2 | 9/2013 | Stern et al. |
| 8,629,358 | B2 | 1/2014 | Rimon et al. |
| 8,686,964 | B2 | 4/2014 | Rimon |
| 8,780,089 | B2 | 7/2014 | Yuan et al. |
| 8,878,823 | B1 | 11/2014 | Kremin et al. |
| 9,063,591 | B2 | 6/2015 | Alameh et al. |
| 9,116,558 | B2 | 8/2015 | Yilmaz et al. |
| 9,122,322 | B2 | 9/2015 | Stern et al. |
| 9,158,393 | B2 | 10/2015 | Vlasov |
| 9,218,073 | B1 | 12/2015 | Kremin et al. |
| 2002/0040817 | A1 | 4/2002 | LeKuch et al. |
| 2004/0001052 | A1 | 1/2004 | Zank |
| 2005/0110777 | A1 | 5/2005 | Geaghan et al. |
| 2005/0166076 | A1 | 7/2005 | Truong |
| 2005/0195387 | A1 | 9/2005 | Zhang et al. |
| 2006/0068851 | A1 | 3/2006 | Ashman, Jr. |
| 2006/0109252 | A1 | 5/2006 | Kolmykov-Zotov et al. |
| 2006/0267966 | A1 | 11/2006 | Grossman et al. |
| 2007/0014490 | A1 | 1/2007 | Silverbrook et al. |
| 2007/0085836 | A1 | 4/2007 | Ely |
| 2007/0146351 | A1 | 6/2007 | Katsuhira et al. |
| 2007/0176909 | A1 | 8/2007 | Pavlowski |
| 2008/0128180 | A1 | 6/2008 | Perski et al. |
| 2009/0078476 | A1 | 3/2009 | Rimon et al. |
| 2009/0114459 | A1 | 5/2009 | Fukushima et al. |
| 2009/0122029 | A1 | 5/2009 | Sin |
| 2009/0262637 | A1 | 10/2009 | Badaye et al. |
| 2009/0289922 | A1 | 11/2009 | Henry |
| 2010/0006350 | A1 | 1/2010 | Elias |
| 2010/0051356 | A1 | 3/2010 | Stern et al. |
| 2010/0084203 | A1 | 4/2010 | Peng |
| 2010/0107770 | A1 | 5/2010 | Serban et al. |
| 2010/0155153 | A1 | 6/2010 | Zachut |
| 2010/0214252 | A1 | 8/2010 | Wu |
| 2011/0090146 | A1 | 4/2011 | Katsurahira |
| 2012/0050231 | A1 | 3/2012 | Westhues et al. |
| 2012/0228039 | A1 | 9/2012 | Hinson et al. |
| 2012/0253699 | A1 | 10/2012 | Kuno |
| 2012/0327040 | A1 | 12/2012 | Simon et al. |
| 2013/0141398 | A1 | 6/2013 | Cho et al. |
| 2013/0265265 | A1 | 10/2013 | Stern |
| 2013/0321355 | A1 | 12/2013 | Teiblum |
| 2014/0002422 | A1 | 1/2014 | Stern et al. |
| 2014/0019070 | A1 | 1/2014 | Dietz et al. |
| 2014/0132529 | A1 | 5/2014 | Jeong |
| 2014/0210781 | A1 | 7/2014 | Stern |
| 2014/0218343 | A1 | 8/2014 | Hicks et al. |
| 2015/0054757 | A1 | 2/2015 | Kuroda |
| 2015/0070316 | A1 | 3/2015 | Oda et al. |
| 2015/0070330 | A1 | 3/2015 | Stern |
| 2015/0116289 | A1 | 4/2015 | Stern et al. |
| 2015/0370354 | A1 | 12/2015 | Stern et al. |
| 2016/0124530 | A1 | 5/2016 | Stern |
| 2016/0231833 | A1 | 8/2016 | Gu et al. |
| 2017/0045962 | A1 | 2/2017 | Stern et al. |
| 2017/0068345 | A1 | 3/2017 | Barel |

FOREIGN PATENT DOCUMENTS

| | | |
|---|---|---|
| EP | 2187288 | 5/2010 |
| EP | 2204724 | 7/2010 |
| EP | 2339432 | 6/2011 |
| EP | 1349056 | 7/2011 |
| EP | 2650758 | 10/2013 |
| JP | 6-119101 | 4/1994 |
| JP | 03-327056 | 9/2002 |
| WO | WO 01/24157 | 4/2001 |
| WO | WO 02/41129 | 5/2002 |
| WO | WO 2009/143046 | 11/2009 |
| WO | WO 2010/086035 | 8/2010 |
| WO | WO 2012/123951 | 9/2012 |
| WO | WO 2013/160887 | 10/2013 |
| WO | WO 2015/027017 | 2/2015 |
| WO | WO 2014/043239 | 3/2015 |
| WO | WO 2016/020818 | 2/2016 |

OTHER PUBLICATIONS

Official Action Dated Dec. 19, 2016 From the US Patent and Trademark Office Re. U.S. Appl. No. 14/848,527. (34 pages).
Official Action Dated Mar. 24, 2017 From the US Patent and Trademark Office Re. U.S. Appl. No. 14/702,726. (48 pages).
Official Action Dated Apr. 14, 2017 From the US Patent and Trademark Office Re. U.S. Appl. No. 14/930,815. (44 pages).
Restriction Official Action Dated Mar. 1, 2017 From the US Patent and Trademark Office Re. U.S. Appl. No. 14/930,815. (5 pages).
Restriction Official Action Dated Feb. 17, 2017 From the US Patent and Trademark Office Re. U.S. Appl. No. 14/702,726. (6 pages).
Official Action Dated Apr. 12, 2017 From the US Patent and Trademark Office Re. U.S. Appl. No. 15/338,549. (43 pages).
Advisory Action Before the Filing of an Appeal Brief Dated Sep. 15, 2016 From the US Patent and Trademark Office Re. U.S. Appl. No. 14/395,837.
Communication Relating to the Results of the Partial International Search Dated Oct. 13, 2015 From the International Searching Authority Re. Application No. PCT/IB2015/055863.

(56) References Cited

OTHER PUBLICATIONS

Communication Relating to the Results of the Partial International Search Dated Jul. 25, 2012 From the International Searching Authority Re. Application No. PCT/IL2012/050095.
International Preliminary Report on Patentability Dated Nov. 6, 2014 From the International Bureau of WIPO Re. Application No. PCT/IL2012/050143.
International Preliminary Report on Patentability Dated Oct. 19, 2016 From the International Preliminary Examining Authority Re. Application No. PCT/IB2015/055863.
International Preliminary Report on Patentability Dated Sep. 26, 2013 From the International Bureau of WIPO Re. Application No. PCT/IL2012/050095.
International Search Report and the Written Opinion Dated Mar. 6, 2014 From the International Searching Authority Re. Application No. PCT/IL2013/050836.
International Search Report and the Written Opinion Dated Sep. 7, 2012 From the International Searching Authority Re. Application No. PCT/IL2012/050095.
International Search Report and the Written Opinion Dated Jan. 16, 2013 From the International Searching Authority Re. Application No. PCT/IL2012/050143.
International Search Report and the Written Opinion Dated Jan. 26, 2016 From the International Searching Authority Re. Application No. PCT/IB2015/055863.
Invitation to Pay Additional Fees Dated May 31, 2016 From the International Preliminary Examining Authority Re. Application No. PCT/IB2015/055863.
Notice of Allowance Dated Feb. 3, 2015 From the US Patent and Trademark Office Re. U.S. Appl. No. 13/908,063.
Notice of Allowance Dated Aug. 19, 2016 From the US Patent and Trademark Office Re. U.S. Appl. No. 14/451,448.
Notice of Allowance Dated Mar. 22, 2013 From the US Patent and Trademark Office Re. U.S. Appl. No. 12/546,753.
Notice of Allowance Dated Apr. 24, 2015 From the US Patent and Trademark Office Re. U.S. Appl. No. 14/005,308.
Notice of Allowance Dated Jul. 29, 2016 From the US Patent and Trademark Office Re. U.S. Appl. No. 14/839,985.
Official Action Dated Jul. 3, 2012 From the US Patent and Trademark Office Re. U.S. Appl. No. 12/546,753.
Official Action Dated Jun. 3, 2014 From the US Patent and Trademark Office Re. U.S. Appl. No. 13/908,063.
Official Action Dated May 5, 2016 From the US Patent and Trademark Office Re. U.S. Appl. No. 14/395,837.
Official Action Dated May 6, 2016 From the US Patent and Trademark Office Re. U.S. Appl. No. 14/451,448.
Official Action Dated Oct. 8, 2015 From the US Patent and Trademark Office Re. U.S. Appl. No. 14/395,837.
Official Action Dated Dec. 19, 2013 From the US Patent and Trademark Office Re. U.S. Appl. No. 13/908,063.
Official Action Dated Oct. 19, 2012 From the US Patent and Trademark Office Re. U.S. Appl. No. 12/546,753.
Official Action Dated Oct. 21, 2015 From the US Patent and Trademark Office Re. U.S. Appl. No. 14/451,448.
Official Action Dated Feb. 22, 2016 From the US Patent and Trademark Office Re. U.S. Appl. No. 14/839,985.
Official Action Dated Nov. 25, 2014 From the US Patent and Trademark Office Re. U.S. Appl. No. 14/005,308.
Official Action Dated Jan. 31, 2012 From the US Patent and Trademark Office Re. U.S. Appl. No. 12/546,753.
Supplemental Notice of Allowability Dated May 8, 2013 From the US Patent and Trademark Office Re. U.S. Appl. No. 12/546,753.
Written Opinion Dated Sep. 2, 2016 From the International Preliminary Examining Authority Re. Application No. PCT/IB2015/055863.
Hoffman "Not All Tablet Styluses Are Equal: Capacity, Wacom, and Bluetooth Explained", How-to-Geek, 4 P., Sep. 12, 2013.
IBM "Automatic Switching Stylus for Pen-Based Computer Systems", IBM Technical Disclosure Bulletin, XP000419075, 36(12): 583-584, Dec. 1, 1993.
Jones "Stylus Reviews: TrueGlide Apex Review", iPad for Artists, 4 P., Nov. 21, 2013.
Song et al. "Grips and Gestures on a Multi-Touch Pen", Proceedings of the SIGCHI Conference on Human Factors in Computing Systema, CHI'11, Session: Flexible Grips & Gestures, Vancouver, BC, Canada, May 7-12, 2011, p. 1323-1332, May 2011.

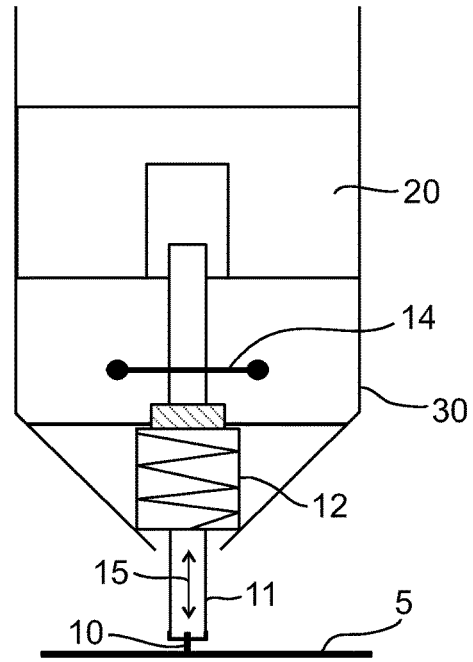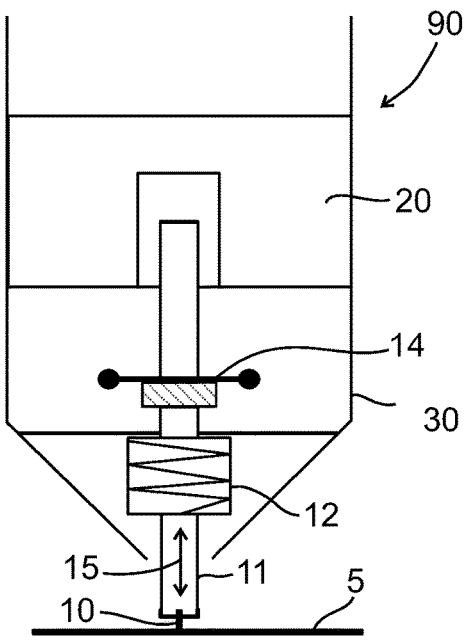
FIG. 1A　　　　FIG. 1B
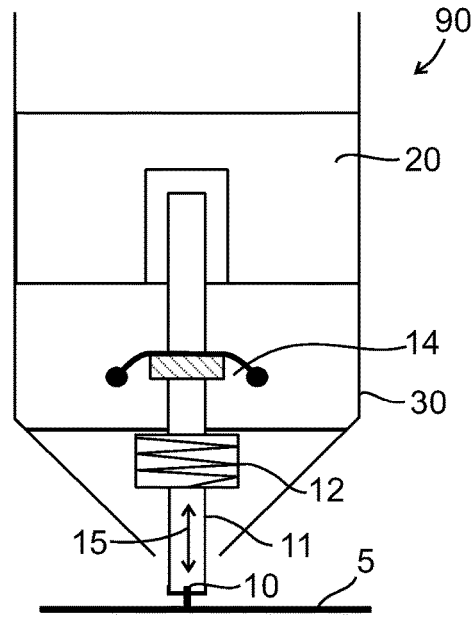
FIG. 1C

PRESSURE SENSITIVE STYLUS FOR A DIGITIZER

RELATED APPLICATIONS

This application is a continuation of U.S. patent application Ser. No. 14/451,448 filed on Aug. 5, 2014, which claims the benefit of U.S. Provisional Patent Application No. 61/876,888 filed on Sep. 12, 2013. The contents of the above applications are all incorporated by reference as if fully set forth herein in their entirety.

FIELD OF THE INVENTION

The present invention, in some embodiments thereof, relates to signal transmitting styluses used for interaction with digitizer sensors, and more particularly, but not exclusively to styluses that transmit signals responsive to pressure exerted on their tip.

BACKGROUND OF THE INVENTION

Electromagnetic styluses are known in the art for use and control of a digitizer. Position detection of the stylus provides input to a computing device associated with the digitizer and is interpreted as user commands. Position detection is performed while the stylus tip is either touching and/or hovering over a detection surface of the digitizer.

Often, the digitizer is integrated with a display screen and a position of the stylus over the screen is correlated with virtual information portrayed on the screen.

U.S. Patent Application Publication No. 20100051356 entitled "Pressure Sensitive Stylus for a Digitizer" assigned to N-Trig Ltd., the contents of which is incorporated herein by reference, describes a pressure sensitive stylus with a movable tip that recedes within a housing of the stylus in response to user applied contact pressure and an optical sensor enclosed within the housing for optically sensing the displacement of the tip and for providing output in response to the sensing. It is disclosed that the relationship between tip displacement and contact pressure and/or the relationship between tip displacement and output of the optical sensor can be non-linear.

Non-linearity can be achieved by non-linear properties of a resilient element positioned to resist displacement of the tip, or by shape of an aperture through which the optical signal of the optical sensor is received.

U.S. Pat. No. 7,202,862 entitled "Pressure sensor for a digitizer pen," the contents of which is incorporated herein by reference, describes a digitizer pen that has a pressure sensor for sensing pressure transferred from a writing tip. It is described that an elastomer disk is mounted between a writing tip holder of the pen and the pressure sensor. When the writing tip is pressed against a sensing surface, such as a digitizer tablet, the end of the stylus opposite the writing tip moves the tip holder against the elastomer disk and transfers pressure from the tip holder to the pressure sensor. At first the tip holder penetrates the elastomer disk a certain amount and then in response to additional pressure on the tip, the tip holder and elastomer disk moves toward and actuates the pressure sensor. The force applied to the pressure sensor by the elastomer disk is an input to the pressure sensor.

U.S. Pat. No. 5,571,997 entitled "Pressure sensitive pointing device for transmitting signals to a tablet," the contents of which is incorporated herein by reference, describes a pressure sensitive pen system. The force applied by a user results in limited motion of the pen tip, the initial motion of which is utilized to actuate a pen down switch; this switch actuation may be used to provide a signal to be radiated by the pen to the tablet to inform the latter that the pen is in contact with the tablet surface.

Additional force applied by the user is subsequently utilized as a means for varying the radiated frequency to provide a basis for the tablet system to determine the force being used by the user as the pen travels over the surface of the tablet.

U.S. Pat. No. 7,292,229 entitled "Transparent Digitizer" which is assigned to N-trig Ltd., the contents of which is incorporated herein by reference, describes a passive electro-magnetic stylus which is triggered to oscillate at a resonant frequency by an excitation coil surrounding a digitizer. The oscillating signal is sensed by the digitizer. The stylus operates in a number of different states including hovering, tip touching, right click mouse emulation, and erasing. The various states are identified by dynamically controlling the resonant frequency of the stylus so that the stylus resonates at a different frequency in each state. A position of the stylus, e.g. the stylus' tip with respect to the digitizer sensor is determined based on signals sensed from sensor.

SUMMARY OF THE INVENTION

According to an aspect of some embodiments of the present invention, there is provided a stylus including a tip pressure detecting system for monitoring contact pressure on a writing tip. Typically, the tip pressure detecting system provides input for switching between a hover operational mode (pen up) and a touch operational mode (pen down) at a defined contact pressure on the tip. Optionally, the system additionally provides for monitoring different pressure levels within a touch operational mode (pen down).

An aspect of some embodiments of the present invention provides for a pressure sensitive stylus for operation with a digitizer sensor comprising: a housing; a writing tip that is movable and recedes toward the housing of the stylus in response to contact pressure applied on the writing tip; an extremity that is movable together with the writing tip; a switch comprising: a first element that is fixedly positioned around the extremity; and a second element that is fixed to the housing, wherein physical contact between the first element and the second element closes the switch; an elastomer element positioned around the extremity and in physical contact with at least one of the housing or an element that is fixed to the housing, wherein the writing tip is operable to move in response to the elastomer element compressing against at least one of the housing or an element that is fixed to the housing; and wherein the switch is operative to toggle at a pre-defined compressed state of the elastomer element.

Optionally, the pre-defined compressed state defines a transition between a hover operational state and a touch operational state of the stylus.

Optionally, the pre-defined compressed state defines a transition between a sleep mode and an active mode of the stylus.

Optionally, the switch is operable to alter at least one of a repetition rate, a duty cycle and a power state of the stylus.

Optionally, the pressure sensitive stylus includes a controller operative to monitor toggling of the switch; and a transmitting unit for transmitting the operational state of the stylus to a digitizer sensor that is operated together with the stylus.

Optionally, the first element is formed from a conductive material, wherein the second element includes two terminals and wherein contact between the first element and the second element shorts the two terminals.

Optionally, the first element or the second element is formed from a conductive material that is pliable.

Optionally, the first element or the second element is formed from conductive particles embedded in at least one of silicon, rubber, thermoplastic polyurethane and polyoxymethylene.

Optionally, the elastomer element is integral to one of the first element or the second element.

Optionally, the elastomer element includes a base surface and at least one protruding element extending from the base surface and wherein the switch is operative to toggle in response to the at least one protruding element resiliently collapsing due to the elastomer element compressing against the at least one of the housing or the element that is fixed to the housing.

Optionally, the switch is a normally closed switch, and wherein the first and second element of the switch is separated responsive to the writing tip receding toward the housing of the stylus.

Optionally, the switch is a normally open switch, and wherein the first and second element of the switch is brought into contact responsive to the writing tip receding toward the housing of the stylus.

Optionally, the elastomer element includes a base surface and a plurality of protruding elements extending from the base surface, wherein the first element includes a plurality of through going holes matching the plurality of protruding elements, and wherein the first element is fitted on the elastomer element so that the plurality of protruding elements protrude through the plurality of through going holes.

Optionally, the plurality of protruding elements are positioned to physically contact the second element of the switch and are sized to separate the first element of the switch from the second element of the switch over a pre-defined displacement of the writing tip associated with a hover operational state of the stylus.

Optionally, the first element comprises a first conductive layer and the second element comprises a second conductive layer such that the first and second conductive layers face each other, wherein a first conductive layer is laminated with a non-conductive layer having a defined dielectric coefficient, and wherein during an open state of the switch a dielectric coefficient of an air gap that forms between the non-conductive layer and the second conductive layer dominates a combined dielectric coefficient of the air gap and non-conductive layer.

Optionally, the pressure sensitive stylus includes a controller operative to detect changes in capacitance in the switch responsive to movement of the writing tip.

Optionally, the pressure sensitive stylus includes a displacement monitor operative to monitoring displacements of the writing tip over a range of displacements; a controller operative to sample output from the displacement monitor; and a transmitting unit operative to transmit information associated with the output sampled to a digitizer sensor operated together with the stylus.

Optionally, the range of displacements is a range corresponding to a touch operational mode of the stylus.

Optionally, at least one of sampling output from the displacement monitor and transmitting information associated with the output sampled is responsive toggle state of the switch.

Optionally, the displacement monitor is an optical detector for optically sensing the displacement of the tip and for providing output in response to the sensing.

Optionally, the pressure sensitive stylus includes a measuring rod movable with the writing tip, wherein the measuring rod includes an aperture through which an optical signal of the optical detector is detected and wherein the output of the optical detector is altered based on an overlap area between the aperture and an optical transmission and detecting area of the optical detector.

Optionally, the elastomer element is shaped as flat ring.

Optionally, the pressure sensitive stylus includes a sleeve element movable between two partitions formed as part of the housing, wherein the extremity is fitted through the sleeve element and fixedly connect to the sleeve element so that tip movement is confined by movement of the sleeve element.

An aspect of some embodiments of the present invention provides for a pressure sensitive stylus for operation with a digitizer sensor comprising: a housing; a writing tip that is movable and recedes toward the housing of the stylus in response to contact pressure applied on the writing tip; an extremity that is movable together with the writing tip; a switch comprising: a first conductive layer fixedly positioned on an element positioned around the extremity; and a second conductive layer facing the first conductive layer, wherein the second conductive layer is fixed to the housing; wherein one of the first conductive layer and the second conductive layer is laminated with a non-conductive material; and wherein one of the first conductive layer and the second conductive layer is integrated with an elastomer element including one or more protrusions extending toward the other one of the first conductive layer and the second conductive layer; and wherein physical contact between the first conductive layer and the second layer responsive to compression of the elastomer element closes the switch, wherein the physical contact is detected as a change in capacitance due to an absence of an air gap between the first and second layer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A, 1B and 1C are simplified schematic drawings of a known tip pressure detecting system of a pressure sensitive stylus in a neutral state, a hover state and a touch operational state respectively;

DESCRIPTION OF SPECIFIC EMBODIMENTS OF THE INVENTION

Figure 2:
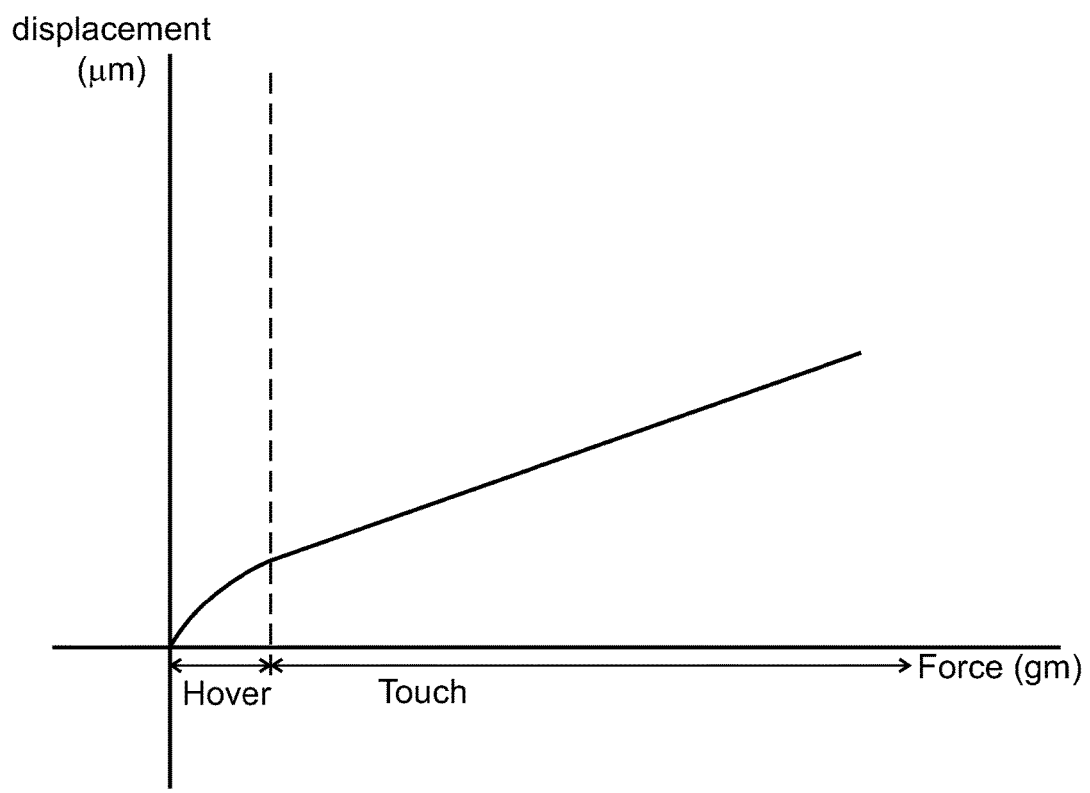
FIG. 2 is a simplified graph of a relationship between applied pressure on a tip of a stylus and displacement of the tip obtained by a known tip pressure detecting system.

The present invention, in some embodiments thereof, relates to signal transmitting and/or resonating styluses used for interaction with digitizer sensors, and more particularly, but not exclusively to styluses that transmit signals responsive to pressure exerted on their tip.

According to some embodiments of the present invention, the tip pressure detecting system determines tip pressure based on detected displacement of the tip.

Typically, the system includes a contact switch that provides input regarding a switch between a hover operational mode (pen up) and a touch operational mode (pen down). Optionally, when the tip reaches a threshold displacement the contact switch either opens if it is a normally closed switch or closes if it is a normally open switch.

Due to manufactory tolerances between different styluses and the demand for same tip travel distance and pressure for tip activation in the system, variability in the tip pressure corresponding to the threshold displacement may exist between different pens, and additional variability may occur over time due to wear and tear of the components and/or due to changes in temperature. The present inventors have found that a stable pressure threshold at a desired pressure level may be reached by reducing number of accumulating parts tolerances based on a method of assembly as described herein.

According to some embodiments of the present invention, the contact switch is formed by two or more conductive members laid in two layers and with non-conductive material in between the layers. Typically, at least one of the two layers is formed with relatively soft material designed for absorbing mechanical tolerances, thus providing compensation for manufacturing inaccuracies.

According to some embodiments of the present invention, the tip pressure detecting system includes an elastomer element that provides a counterbalancing pressure on the tip in response to contact pressure applied on the writing tip. Typically, the sensitivity and/or the stiffness of the tip is defined by the properties of the elastomer element as well as an amount of contact area formed between the elastomer element and an interacting element that moves with the writing tip and presses against the elastomer and/or between the elastomer element and wall against which the elastomer is compressed. In some exemplary embodiments, a desired non-linear response of the elastomer element is provided by altering in a stepwise fashion the amount of contact area formed between the elastomer element and the interacting element around a pressure defined for switching between hover and touch operational mode. Typically, increasing the amount of contact area increases the stiffness or resistive force of the tip to displacement. The present inventors have found that the non-linear stiffness provides a better feel for a user using the stylus. Typically, the non-linear stiffness allows a user to apply low pressure on the tip, e.g. a comfortable level of pressure to switch to a touch operational state but also prevents the tip from moving excessively while a user applies a higher pressure on the tip.

In some exemplary embodiments, a tip pressure detecting system additionally includes an optical sensor for monitoring different pressures applied on the tip based on tip displacement. In some exemplary embodiments, the optical sensor is only used in response to detecting a touch operational state of the tip with the contact switch.

Alternatively, the optical sensor is not included and different pressure levels in the working range of the touch operational state are not monitored.

For purposes of better understanding some embodiments of the present invention, as illustrated in FIGS. 3-11 of the drawings, reference is first made to the construction and operation of a known tip pressure detecting system of a stylus as illustrated in simplified schematic drawings of FIGS. 1A, 1B and 1C and to a simplified representation of a response of the known system to applied pressure as shown in a graph in FIG. 2.

In some known styli, a tip pressure detecting system 90 monitors tip contact pressure based on a detected displacement of a tip holder 11. Tip holder 11 is rigidly connected to a tip 10 in an axial direction 15. Displacement is measured by a displacement detector 20 based on which a hover and touch operational state is defined.

Typically, when a threshold displacement from a defined reference point is exceeded, e.g. 50 μm, the stylus switches from a hover to a touch operational state.

In one known tip pressure detecting system 90, two different spring elements 12, 14 provide resilient forces to counterbalance pressure applied on tip 10 and define a relationship between tip contact pressure and measured tip displacement. A coil spring 12 is used to counterbalance low contact pressure on the tip occurring during a defined hover operational mode (FIG. 1B), while a Nickel Titanium (NiTi) wire 14 is additionally applied to counterbalance higher contact pressure and discriminate between the different pressure levels on the tip occurring during a defined touch operational state (FIG. 1C). The additional counterbalancing force provided by the NiTi wire 14 alters the relationship between tip contact pressure and measured tip displacement. The relationship between tip contact pressure and measured tip displacement is thus defined by the resistance of coil spring 12 applied during a hover operational state, and by coil spring 12 and NiTi wire 14 applied during a touch operational state (FIG. 2).

Displacement for activating a touch operational state is defined by dimensions of the tip holder and a fixed distance between the tip holder and the NiTi wire. This change in response may indicate to a user and may also provide indication to displacement detector 20 that the defined displacement for touch has been reached.

During assembly of this tip pressure detecting system, spring element 12 and NiTi wire 14 are required to be accurately positioned, so that NiTi wire 14 is activated at the desired displacement that is defined for switching. Due to accumulation of tolerances, variations between different styluses may be quite large making a calibration procedure difficult. The present inventors have found that tolerances of the system can be reduced and the calibration of the system can be simplified by using a single resilient element to provide the two different phases of the tip response to pressure. The present inventors believe that by simplifying the assembly and the calibration procedure, costs can be reduced and the uniformity between styluses can be improved.

Before explaining at least one embodiment of the invention in detail, it is to be understood that the invention is not necessarily limited in its application to the details in construction and the arrangement of the components and/or methods set forth in the following description and/or illustrated in the drawings. The invention is capable of other embodiments or of being practiced or carried out in various ways.

Figure 3A:
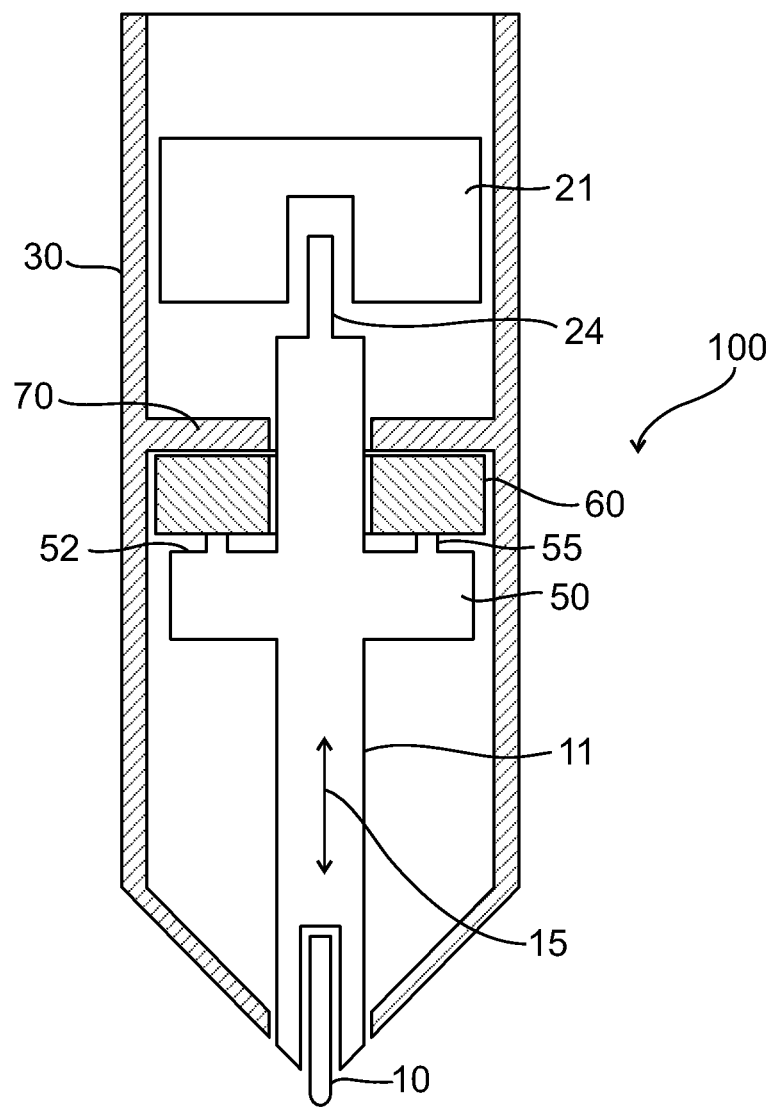
FIGS. 3A, 3B and 3C are simplified schematic drawing showing an exemplary tip pressure detecting system of a pressure sensitive stylus in a neutral position, a hover operational state and a touch operational state respectively, in accordance with some embodiments of the present invention.
Figure 3B:
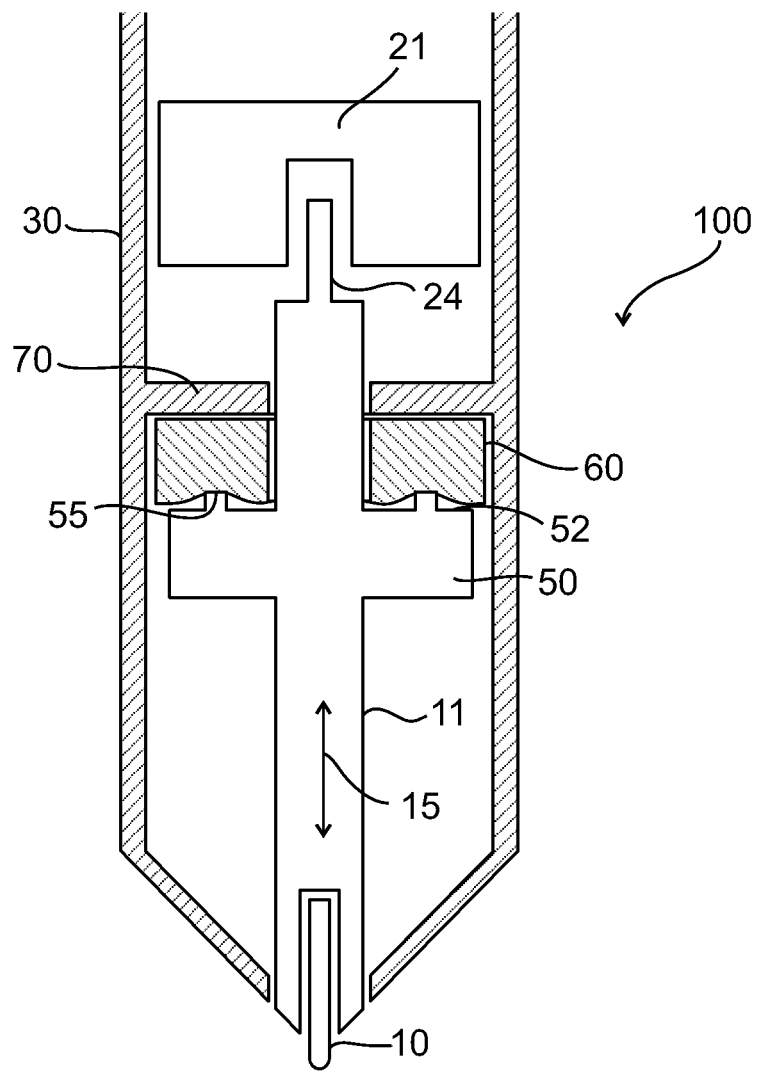
Figure 3C:
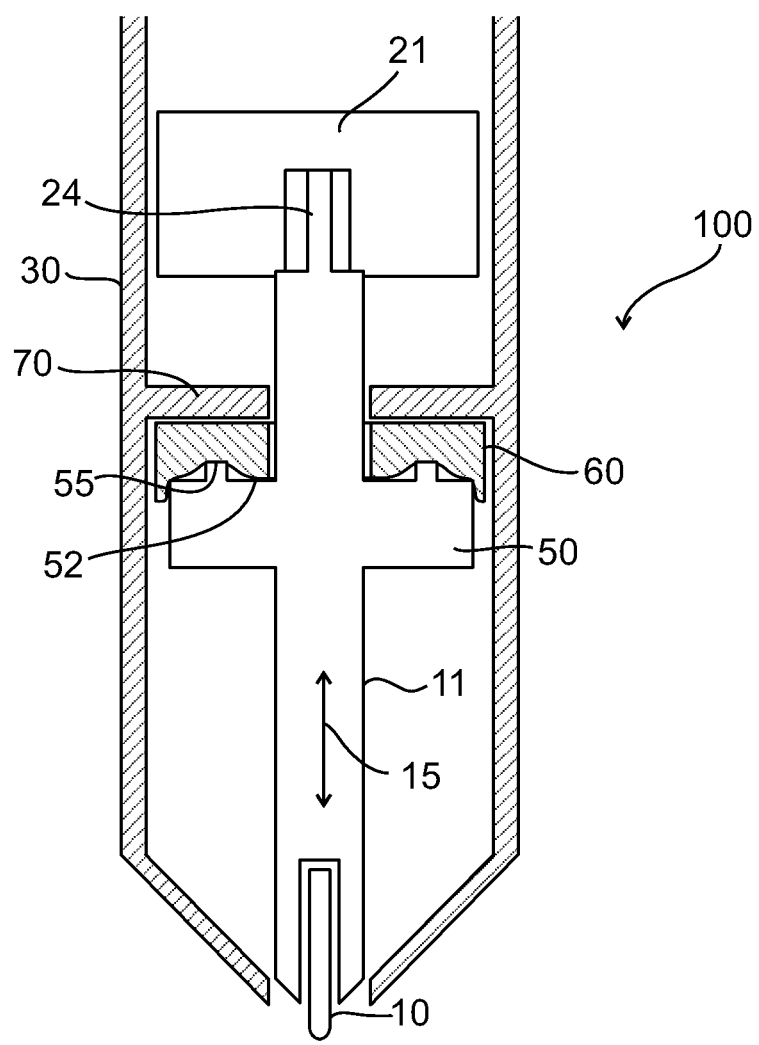

Referring now to the drawings, FIGS. 3A, 3B and 3C are simplified schematic drawings showing a tip pressure detecting system of a pressure sensitive stylus in a neutral position, a hover operational state and a touch operational state, respectively, all in accordance with some embodiments of the present invention. Typically, tip pressure detecting system 100 is part of a pressure sensitive stylus. A pressure sensitive stylus typically includes a tip pressure detecting system as well as other components, for example processing circuitry, a communication unit and a power source. According to some embodiments of the present invention, tip pressure detecting system 100 includes a displaceable writing tip 10, a displaceable tip holder 11 rigidly connected to tip 10, an elastomer element 60 that provides a counter balancing force in response to displacement of tip 10 and/or tip holder 11, and a tip displacement detector 21 for detecting displacement of tip 10. Typically, tip 10 is displaceable in a direction 15, e.g. along a longitudinal axis of tip 10 and/or tip holder 11 responsive to contact pressure applied on tip 10 as when writing with a stylus.

According to some embodiments of the present invention, tip holder 11 includes an extremity 50 that is formed and positioned to engage elastomer element 60 when pressure is applied on tip 10 and press against elastomer element 60 with extremity 50 and wall 70. According to some embodiments of the present invention, extremity 50 includes a base surface 52 and one or more protrusions and/or protruding parts or surfaces 55 that extend from base surface 52 and provide a relatively smaller contact area with elastomer 60 as compared to base surface 52 of extremity 50. Optionally, one or more protrusions and/or protruding surfaces are alternatively and/or additionally added to wall 70 and/or elastomer 60. In some exemplary embodiments of the present invention, during low contact pressure on tip 10, e.g. small displacements of tip 10, protrusion 55 engages and compresses elastomer element 60, while base 52 does not form direct contact with elastomer element 60. Typically, during larger displacements of tip 10, both protruding surface 55 and base surface 52 engage and compress elastomer 60. Typically, the counterbalancing force applied by elastomer element 60 is significantly larger in response to base surface 52 engaging and compressing elastomer element 60, as compared with the counterbalancing force applied when only protruding surface 55 engages elastomer 60.

According to some embodiments of the present invention, elastomer element 60 is held stationary with respect to a frame and/or housing 30 of the stylus. Optionally, elastomer element 60 is held in place by a niche formed in a frame and/or housing 30 at a tip end of the stylus and/or is supported and/or fixed on a stopping element and/or wall 70, e.g. with glue. Optionally, stopping element 70 is formed by frame, partition and/or housing 30 of the stylus.

According to some embodiments of the present invention, tip displacement detector 21 detects and monitors displacement of tip 10 from a neutral position in which no pressure or a defined threshold pressure, e.g. resulting from a 1-20 gm weight is applied on tip 10. In some exemplary embodiments of the present invention, tip displacement detector 21 is an optical base sensor that detects displacement of a measuring rod 24. Typically, measuring rod 24 is formed from tip holder 11 and/or is rigidly connected to tip holder 11 so that it is displaced together with tip holder 11 and tip 10. It is noted that although element 24 is referred to as a measuring rod for convenience, it is not required to be rod shaped. Optionally element 24 is a flat element.

In some exemplary embodiments, tip displacement detector 21 is similar to an optical detector as described in incorporated U.S. Patent Publication U.S. 2010-0051356.

Alternatively, tip pressure detecting system 100 includes one of a capacitive or resistive based sensor.

In some exemplary embodiments, an operational state of a stylus is defined based on displacement of tip 10 as detected by tip displacement detector 21. Typically, a threshold displacement for activating a touch operational state is pre-defined and a stylus switches from a hover operational state to a touch operational state when the threshold displacement is reached and/or exceeded. Likewise a stylus may switch from a touch operational state to a hover operational state when the displacement of the tip is diminished past the pre-defined threshold. Typically displacement is measured relative to a defined neutral position of tip 10 when no pressure is applied on it and/or pre-defined reference position. Optionally, output transmitted by a stylus, e.g. to an associated digitizer sensor and/or host computer is altered in response to detected displacements of the tip 10.

Tip pressure related output transmitted by a stylus may provide information regarding an operational state of a stylus. Exemplary operational states of the stylus may include hover, touch, eraser, and right click. Optionally, a touch operational state includes a plurality of operational states based on different pressure levels. Optionally, output transmitted by the stylus additionally provides information that can be used for various applicative purposes, such as altering a width of a line displayed on an associated screen in response to a stylus stroke. Optionally, in such embodiments, a width of the line is a function of pressure applied on the tip while performing the stroke with the stylus.

Referring now to FIG. 3A, typically during a neutral position of the stylus tip 10, tip holder 11 is positioned with respect to elastomer element 60 so that protrusion 55 touches elastomer element 60 without applying a compressive force on elastomer 60.

Optionally, in a neutral position, a protrusion 55 engages elastomer element 60 with a defined amount of pressure or alternatively, tip holder 11 is positioned so that there is a defined gap between protrusion 55 and elastomer element 60. Typically, the stylus is defined to be in a hover operational state while the tip is in a neutral position.

According to some embodiments of the present invention, a hover operational state is also defined for small displacements of tip 10 from its neutral position.

According to some embodiments of the present invention, a height of protruding surface 55 is defined to correspond with a defined maximum tip displacement for a hover operational mode and/or a defined threshold tip displacement for an onset of a touch operational mode. Typically, the relatively small contact area between extremity 50 and elastomer element 60 during the hover operational state when only protrusion 55 engages elastomer element 60, affords a lower counter balancing force applied by the elastomer and a higher sensitivity of the system to changes in applied pressure.

Referring now to FIG. 3B, when pressure is applied on tip 10 during a hover operational state, only a relatively small portion of elastomer 60 is compressed due to the relatively small surface area of protrusion 55. Typically, the counterbalance force applied by elastomer element 60 in this phase is proportional to a surface area of protrusion 55 and/or a function of the surface area.

Typically, once tip 10 is displaced by a distance greater than a height of protrusion 55 as shown in FIG. 3C, the counter balancing force applied by elastomer element 60 is increased, e.g. increased in a step-wise manner, the stiffness of the system is increased and the sensitivity of system 100 to changes in applied pressure is decreased. In some exemplary embodiments, the step change in contact area between elastomer element 60 and extremity 50 affords a significant change in the response of system 100 to applied pressure on the tip. Optionally, elastomer element 60 is formed from silicone rubber, e.g. with a 20-85 durameter (hardness) Shore A. In some exemplary embodiments, the response of system 100 to pressure applied on tip 10 is similar to the response shown in FIG. 2. Optionally, elastomer element 60 is formed from a hardness that provides 0-250 μm displacement of the tip in response to a 0-0.35 kg forced applied on the tip.

According to some embodiments of the present invention, the shape of extremity 50 and the relative size of protrusions 55 and base 52 with respect to size of elastomer element 60 is customized to obtain a desired response of system 100 to pressure applied on tip 10. For example based on the shape and relative size of extremity 50, the slope of each of the phases as well as the switch point can be customized.

According to some embodiments of the present invention, tip holder 11, extremity 50 including protrusion 55 are part of a single element that is molded or machined from a same material. Optionally, tip holder 11 is machined from stainless steel. In some exemplary embodiments, measuring rod 24 is also an integral part of tip holder 11, e.g. molded or machined from a same material and/or is assembled to move together with tip holder 11. Optionally, tip holder 11 and tip 10 are not separate elements, but are formed as one element, e.g. made of a single element, machined or molded as one piece. Typically, housing 30 is molded from plastic, e.g. liquid crystal polymer.

The present inventors have found that accumulated tolerances from different elements in known system 90 may be reduced by replacing the two spring elements 12 and 14 with a single elastomer element 60 and by affecting a change in response at a defined pressure with protrusions included on an extremity 50 of tip holder 11.

Figure 4A:
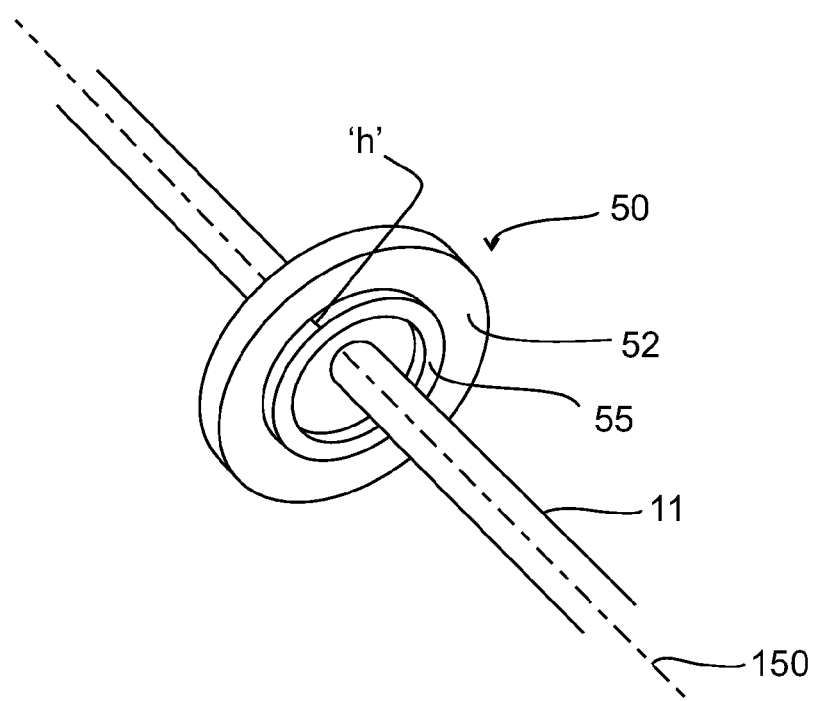
FIGS. 4A, 4B and 4C are simplified schematic drawings of exemplary geometries for an extremity of a tip holder in accordance with some embodiments of the present invention.
Figure 4B:
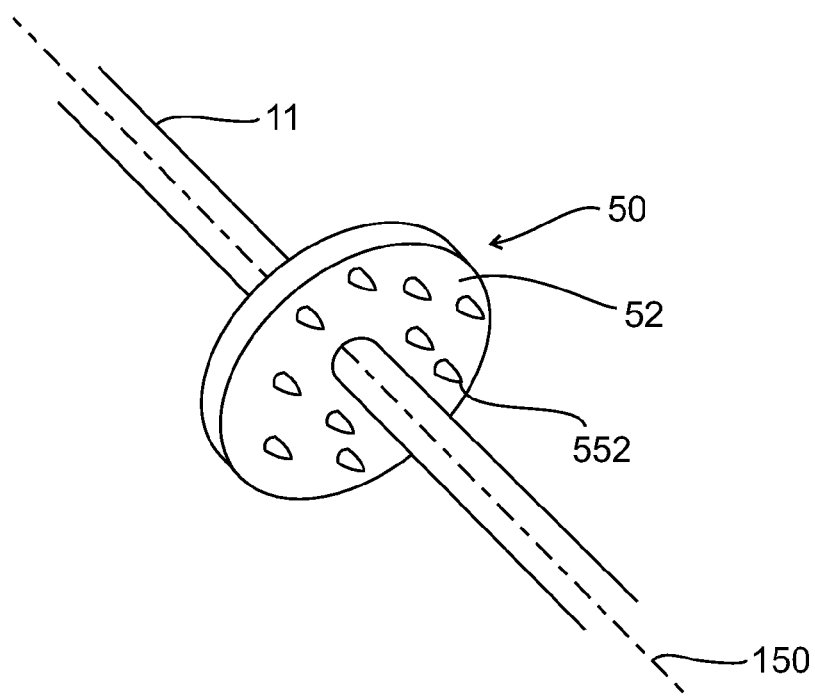
Figure 4C:
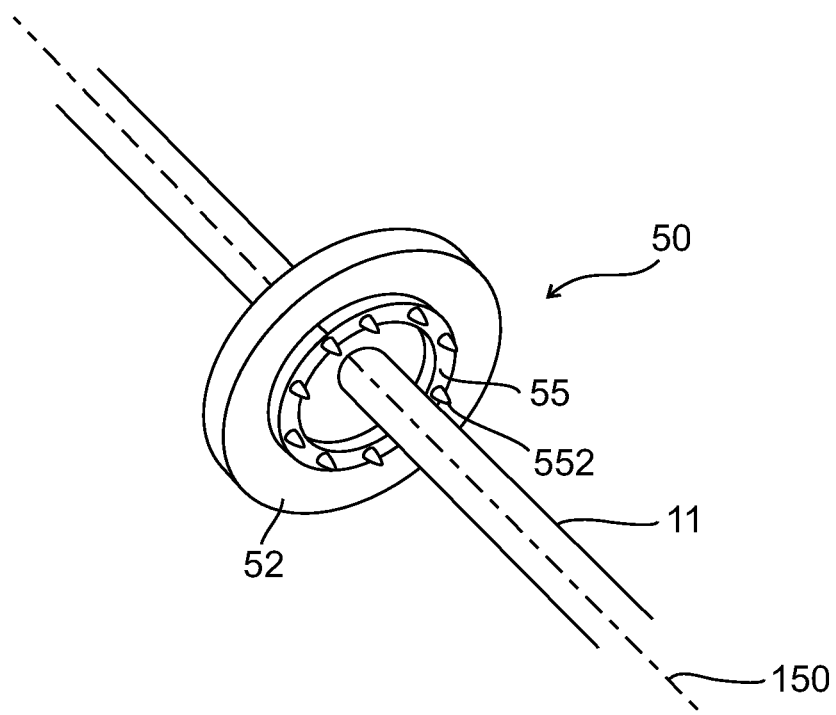

Reference is now made to FIGS. 4A, 4B and 4C showing simplified schematic drawings of exemplary geometries for an extremity of a tip holder in accordance with some embodiments of the present invention. In some exemplary embodiments, exemplary extremity 50 is shaped in the form of a disk or ring surrounding a longitudinal axis 150 of tip holder 11. Alternatively, extremity 50 can be shaped as a square plate, hexagon shaped plate, sphere or other shape. Typically, although not necessarily, extremity 50 is symmetrical around tip holder 11. In some exemplary embodiments, an extremity 50 of tip holder 11 includes a protruding surface 55 in the form of a ring with a rectangular or rounded cross section (FIG. 4A). Typically, protruding surface 55 when shaped as a ring has a defined height 'h' that protrudes from base surface 52. Optionally, a width of protruding surface 55 is constant along height 'h'.

Alternatively, a width of protruding surface 55 is defined to taper distal end from base 52.

Referring now to FIG. 4B, in some exemplary embodiments, an extremity 50 of tip holder 11 is in the form of a plurality of protrusions 552, e.g. spikes and/or bulges.

Optionally, a set of three spikes and/or bulges define a plane. Typically, the spikes or bulges are symmetrically distributed along base surface 52. Referring now to FIG. 4C, optionally, an extremity 50 includes a protruding surface 55 in the form of a ring on which a plurality of bulges 552 are formed. It will be appreciated that other forms and sizes of protrusions can be introduced on the extremity. Optionally, bulges 552 are formed from material applied on the extremity, e.g. UV cured glue which optionally forms a gel.

Figure 5A:
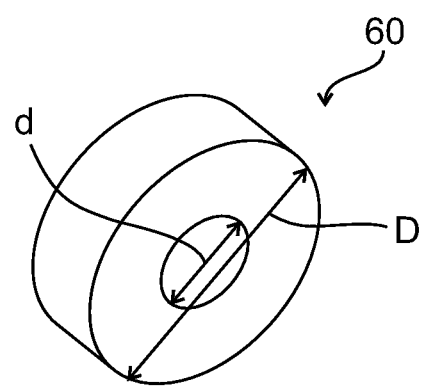
FIGS. 5A, 5B, 5C and 5D are simplified schematic drawings of exemplary elastomer elements included in a tip pressure detecting system, in accordance with some embodiments of the present invention.

Reference is now made to FIG. 5A showing a simplified schematic drawing of an elastomer element included in a tip pressure detecting system in accordance with some embodiments of the present invention. According to some embodiments of the present invention, elastomer element 60 is in the shape of a flat ring and is fitted around tip holder 11. Typically an inner diameter 'd' of elastomer element 60 is large enough to allow free axial movement of tip holder 11. Typically, the outer diameter 'D' and shape of elastomer 60 is defined to generally correspond to size and shape of extremity 50.

Typically, during assembly elastomer element 60 is interdisposed between extremity 50 and stopping element 70 (FIGS. 3A-3C).

Figure 5B:
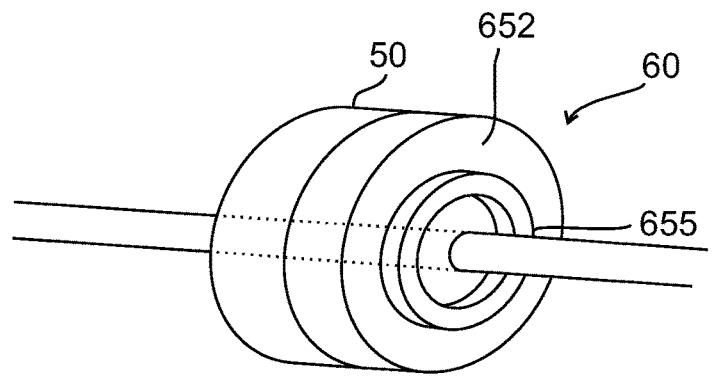
Figure 5C:
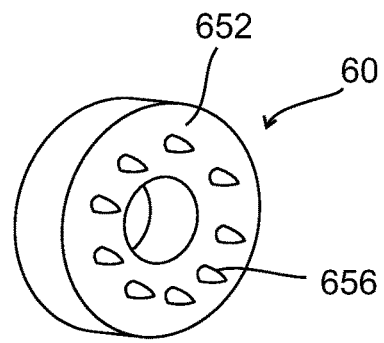
Figure 5D:
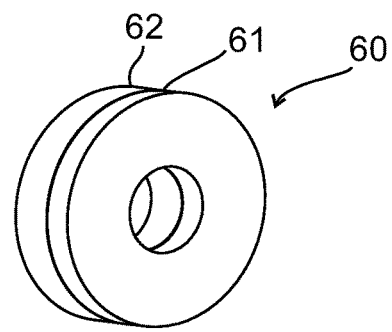

Reference is now made to FIGS. 5B, 5C and 5D showing simplified schematic drawings of alternate exemplary elastomer elements and extremity of a tip holder included in a tip pressure detecting system in accordance with some embodiments of the present invention. Optionally, the desired non-linear response to tip pressure is provided by an elastomer element composed of two layers, e.g. layer 61 and layer 62, each having a different hardness and/or with an elastomer element including one or more protruding surfaces or bulges, e.g. surface 653 and bulges 656. In some exemplary embodiments, an elastomer element 60 is molded with a protruding surface 652 while extremity 50 is flat surface. Optionally, surface 652 faces stopping element 70 (FIG. 3A). Alternatively, surface 655 faces extremity 50. Optionally, elastomer element 60 is molded with a protruding surface 655 on each of its opposite sides so that protruding surface 655 faces both stopping element 70 and extremity 50.

Alternatively and/or additionally, elastomer element 60 includes one or more protrusions 652. Optionally protrusions 652 are used in place of protrusions placed on extremity 50. Protrusions 652 may be positioned on one or both sides of elastomer 60.

According to some embodiments of the present invention, protruding surface 655 and/or protrusions 652 are formed from a different material than that used to form the base of the elastomer, e.g. the rest of elastomer 60. Optionally, the protruding surface 655 and/or protrusions 652 are formed with an elastomer hardness that is lower than that of the base of elastomer 60. In some exemplary embodiments, elastomer element 60 is shaped as a flat disk with two different layers 61 and 62. Optionally, each layer is associated with different elastomer hardness.

Figure 6A:
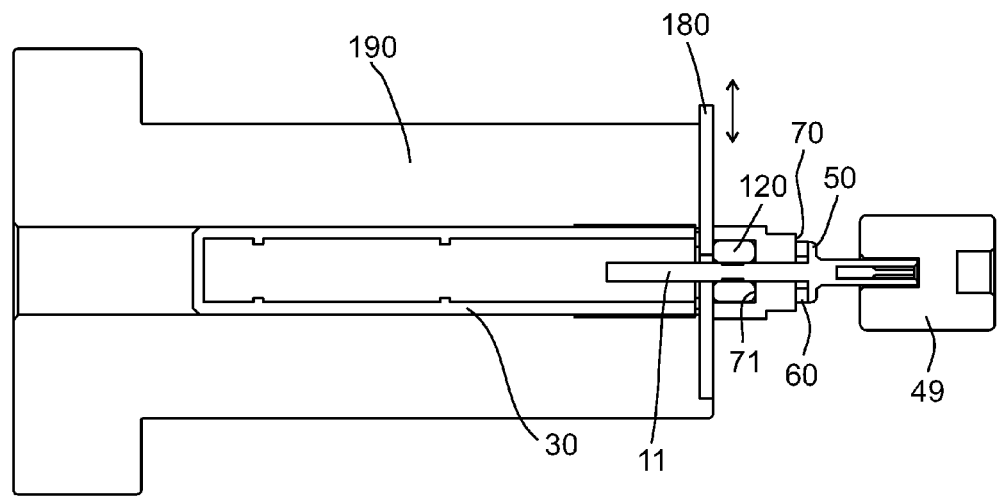
FIGS. 6A and 6B are simplified schematic drawing showing assembly of an exemplary tip pressure detecting system, in accordance with some embodiments of the present invention.
Figure 6B:
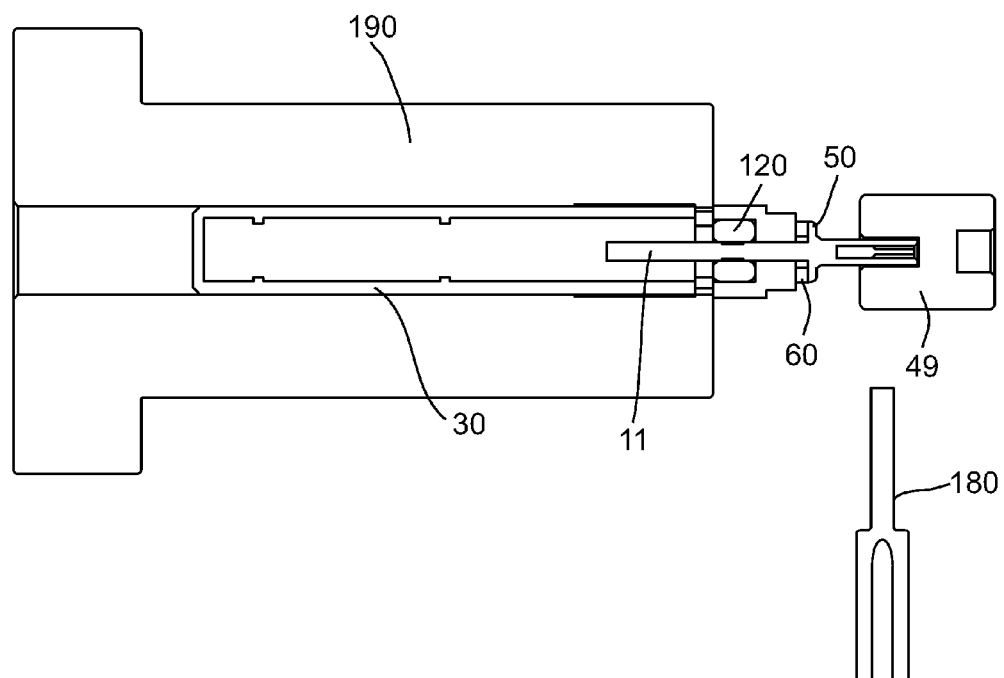

Reference is now made FIGS. 6A and 6B showing simplified schematic drawings of an exemplary method for assembling a tip pressure detecting system in accordance with some embodiments of the present invention. According to some embodiments of the present invention, during assembly, tip holder 11 is fitted through elastomer element 60, through a bore of housing 30 and through sleeve 120 positioned within housing 30.

According to some embodiments of the present invention, sleeve 120 is sized and shaped to limit a range of motion of tip holder 11 within housing 30 and to maintain tip holder 11 in a reference position while no contact pressure is applied on a tip of the stylus. Typically the reference position of tip holder 11 is defined as a position from which tip holder 11 can only move in one direction when fixed to sleeve 120.

Optionally sleeve 120 has a hollow cylindrical shape and is formed from plastic material that is optionally transparent, e.g. high polish polycarbonate (PC) material.

According to some embodiments of the present invention, sleeve 120 is held stationary against wall 71 while tip holder 11 is urged to advance through sleeve 120 toward frame 30 to its reference position where all spaces between the elements are closed, e.g. with a preload of 1-10 gm. In some exemplary embodiments a jig 180 is used to hold sleeve 120 against wall 71. According to some embodiments of the present invention, while tip holder 11 is positioned in the reference position and sleeve 120 is positioned against wall 71, e.g. the reference position of sleeve 120, sleeve 120 is glued to tip holder 11 so that the reference position is fixed. Once tip holder 11 is glued and/or fixed to sleeve 120 at the reference positions, tolerances associated with displacement of the tip and/or tip holder can be defined by tolerances of one moving part and pre-load tolerances. Optionally, tip holder 11 is supported with a support 49 while tip holder is urged toward housing 30. In some exemplary embodiments, a reference position of tip holder 11 is defined when elastomer element 60 is engaged by extremity 50 and wall 70, e.g. optionally with a defined pre-load. Optionally, a nominal force, e.g. self-weight—10 gm force is applied on tip holder 11 to urge extremity 50 and elastomer element 60 toward housing 30, e.g. without compressing elastomer 60. Optionally, a weight of tip holder 11 defines the pre-load for the reference position. Optionally, assembly is performed while tip holder 11 and housing 30 are aligned in the gravitational direction so that the weight of the tip holder 11 and elastomer 60 urges them toward wall 70 of housing 30.

According to some embodiments of the present invention, at the reference position sleeve 120 is fixed to tip holder 11, e.g. glued. Typically, once sleeve 120 is fixed to tip holder 11, jig 180 is removed. Optionally, jig 180 is constructed from a metal material, e.g. stainless steel. Typically, jig 180 is horseshoe shaped so that it can be fitted around tip holder 11 and hold 120 in place. The present inventors have found that by stacking the elements and fixing sleeve 120 to tip holder 11 while the elements are stacked, many of the accumulated tolerances from the different interacting parts can be eliminated.

Figure 7:
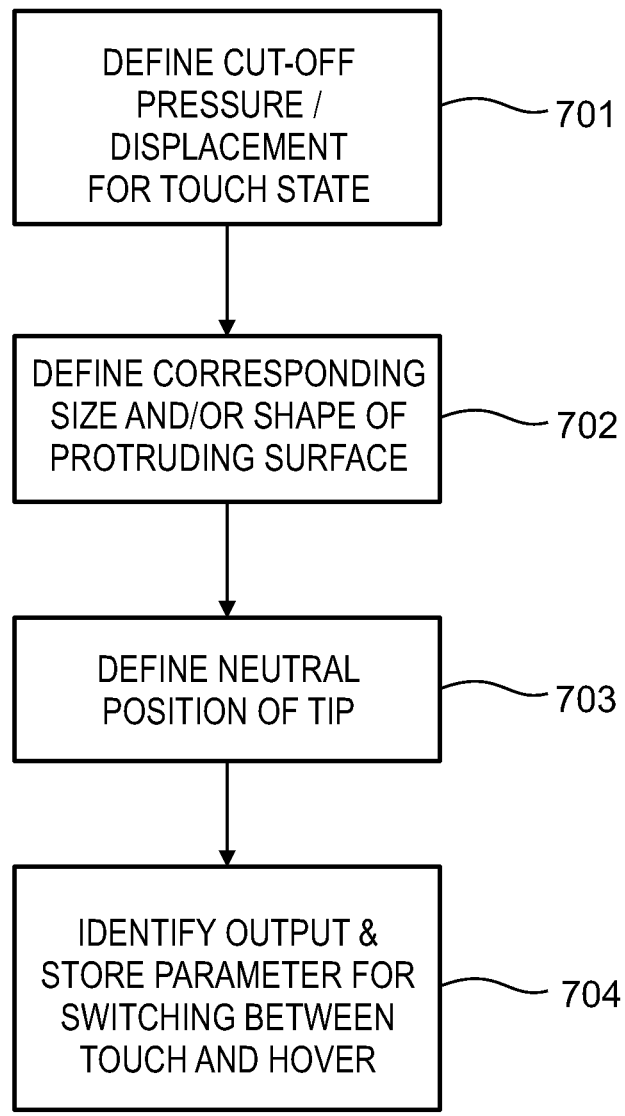
FIG. 7 is a simplified flow chart of an exemplary method for altering a response of a pressure sensitive stylus to changes in pressure in coordination with a switch between a touch and hover operational state of the stylus, in accordance with some embodiments of the present invention.

Reference is now made to FIG. 7 showing a simplified flow chart of an exemplary method for altering a response of a pressure sensitive stylus to changes in pressure in coordination with a switch between a touch and hover operational state of the stylus in accordance with some embodiments of the present invention. According to some embodiments of the present invention, a maximum allowable tip displacement during a hover operational state is defined. Alternatively or additionally, a maximum tip pressure for a hover operational state is defined (block 701). Size and/or shape of a protruding surface are defined to provide a desired response and stiffness (block 702).

The counterbalancing force that will be applied on the tip during a hover operational state can be defined by defining a surface area and/or shape of the protrusion. Typically larger contact surface areas provide a stiffer feel on the tip.

According to some embodiments of the present invention, the defined extremity is positioned next to elastomer element providing the counterbalancing force. Typically, a neutral position of the tip is defined from which displacements are measured (block 703). Typically, the neutral position corresponds to the position of the tip when the extremity of the tip holder engages the elastomer element without applying compressive forces on the elastomer element. In some exemplary embodiments during a calibration procedure, a displacement detector detects displacement of the stylus and the expected non-linear change in response in the vicinity of the switch displacement is identified.

Switching between hover and touch is defined to occur at the identified point and the identified point is stored in the stylus memory (block 704).

Figure 8A:
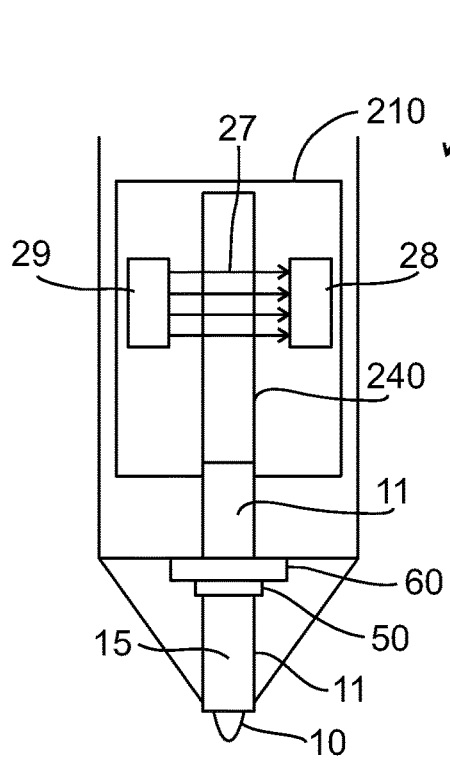
FIGS. 8A, 8B and 8C are simplified schematic drawings of an exemplary tip pressure detecting system with an optical sensor, in accordance with some embodiments of the present invention.
Figure 8B:
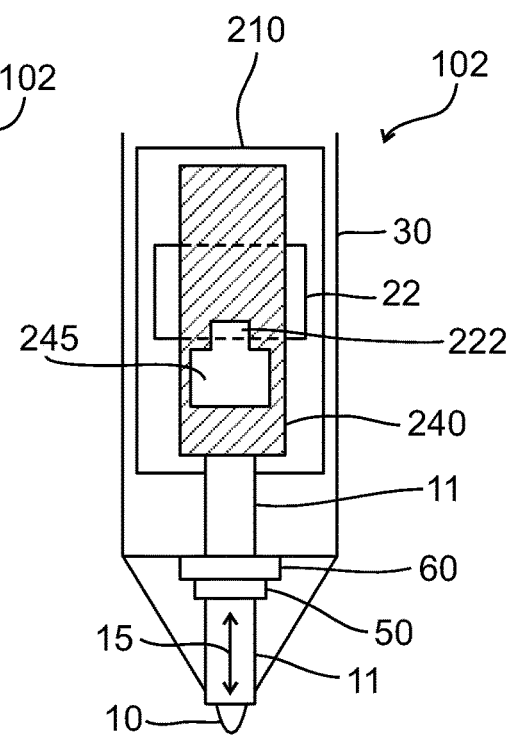
Figure 8C:
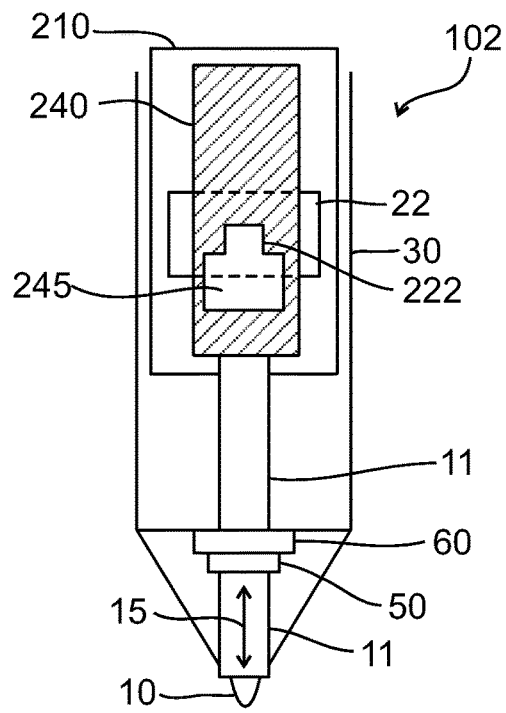

Reference is now made to FIGS. 8A, 8B and 8C showing simplified schematic drawings of a movable tip system and optical sensor for reporting a switch in an operational state of a stylus in accordance with some embodiments of the present invention. According to some embodiments of the present invention, displacement of a stylus tip 10 is detected with an optical sensor 210 that typically includes an emitter 29 emitting an optical signal, e.g. light rays 27 across an area 22, and a detector 28 that detects the optical signal emitted from the emitter 29 across area 22 (FIG. 8A). In some exemplary embodiments, optical sensor 210 is similar to the optical sensor described in incorporated U.S. Patent Publication U.S. 2010-0051356. In some exemplary embodiments, a measuring rod 240 of a tip holder 11 includes an aperture 245 through which the optical signal from emitter 29 can be received by the detector 28 of sensor 240.

Typically, the amount of light received by detector 28 depends on the amount of overlap 222 between aperture 245 and area 22 across which optical signal 30 is transmitted and received. Typically, overlap area 222 is a function of the tip displacement along direction 15. According to some embodiments of the present invention, aperture 245 is shaped to provide a step-wise change in overlap area 222 at a pre-defined displacement of tip 10. Optionally, aperture 245 is shaped as a small rectangle over (or alternatively below) a larger rectangle. Typically, the step-wise change in overlap area 222 provides a non-linear change in a response of the tip pressure detecting system around the pre-defined displacement at which the step-wise and/or non-linear change takes place.

According to some embodiments of the present invention, the pre-defined displacement at which the step-wise change takes place is the displacement defined for switching between a hover and touch operational state. In some exemplary embodiments, the non-linear varying aperture shape is used in conjunction with protrusion 55 on extremity 50 to further accentuate and/or mark a displacement corresponding to a switch between hover and touch. Optionally, the non-linearly shaped aperture is used in place of protrusion 55 on extremity 50.

Figure 9:
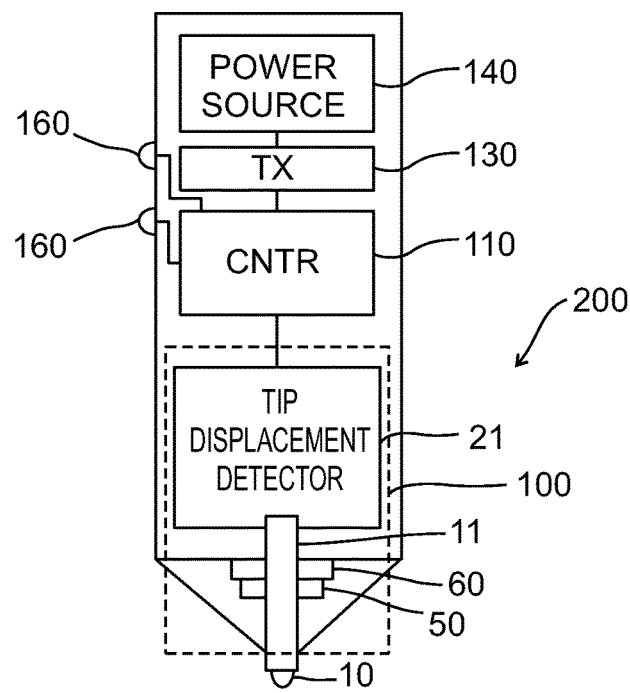
FIG. 9 is a simplified block diagram of a pressure sensitive stylus, in accordance with some embodiments of the present invention.

Reference is now made to FIG. 9 showing a simplified block diagram of a pressure sensitive stylus in accordance with some embodiments of the present invention.

According to some embodiments of the present invention, a pressure sensitive stylus 200 includes a tip pressure detecting system 100, a controller 110, a transmitting unit 130, one or more operation switches 160, and a power source 140, e.g. one or more batteries and/or super capacitor. Typically, tip pressure detecting system 100 includes tip displacement detector 21, tip holder 11 with extremity 50 and elastomer element 60.

Optionally, controller 110 and/or control capability is included in tip pressure detecting system 100. Optionally, stylus 200 is partially or fully powered from an outside source, e.g. an external excitation signal provided by a digitizer system.

According to some embodiments of the present invention, controller 110 controls operation of stylus 200. In some exemplary embodiments, controller 110 additionally provides processing and memory capability, e.g. for operation of tip pressure detecting system 100. In some exemplary embodiments, output from tip pressure detecting system 100 and/or operation switches 160 is processed and optionally stored in controller 110.

Typically output from stylus 200 is transmitted by a transmitting unit 130, and received by an associated digitizer system. In some exemplary embodiments, output from tip pressure detecting system 100 is encoded by controller 110 prior to being transmitted by transmitting unit 130. Optionally, one or more states of one or more operation switches is encoded and transmitted. In some exemplary embodiments, transmitting unit 130 additionally includes reception ability to provide two way communication, e.g. with a digitizer system. Additionally, stylus 200 may comprise, for example, aspects similar to aspects of styluses described in incorporated U.S. Patent Application Publication No. 20080128180.

Figure 10:
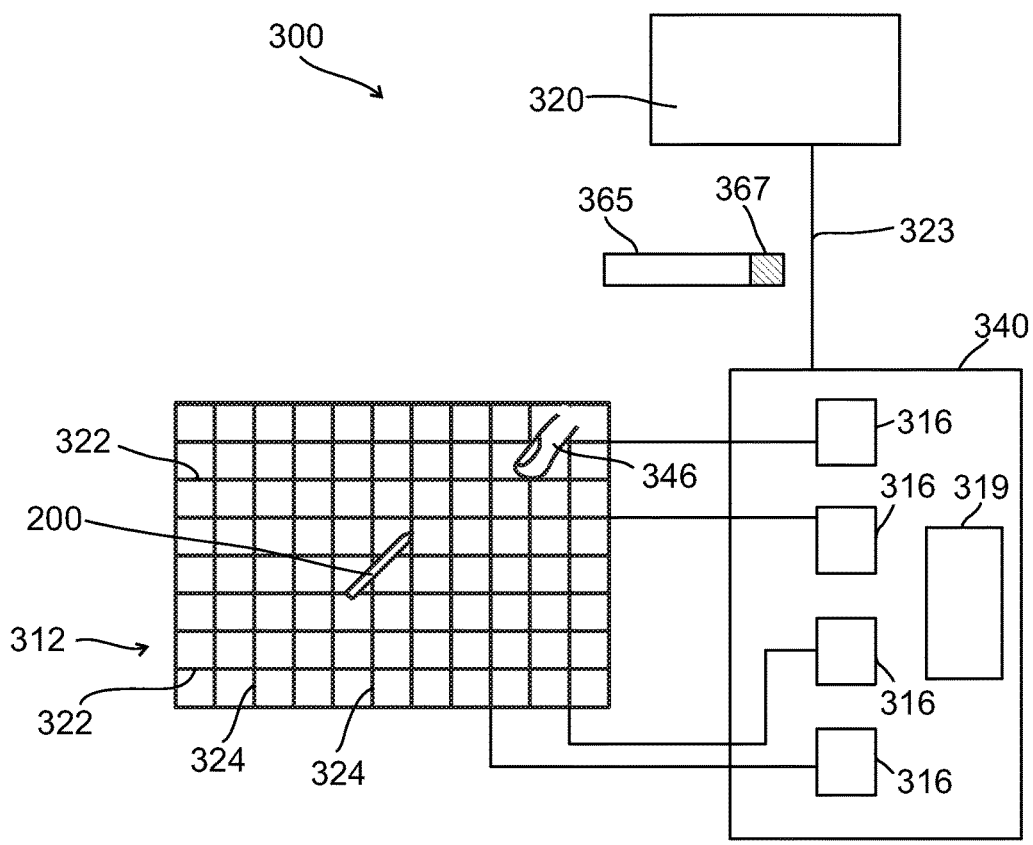
FIG. 10 is a simplified block diagram of an exemplary digitizer system operable to receive input from pressure sensitive stylus in accordance with some embodiments of the present invention.

Reference is now made to FIG. 10 showing a simplified block diagram of a digitizer system including a digitizer sensor in accordance with some embodiments of the present invention. The digitizer system 300 may be suitable for any computing device that enables interactions between a user and the device, e.g. mobile computing devices that include, for example, FPD screens. Examples of such devices include Tablet PCs, pen enabled lap-top computers, tabletop computer, PDAs or any hand held devices such as palm pilots and mobile phones.

According to some embodiments of the present invention, digitizer system 300 includes a sensor 312 for sensing output of stylus 200 and/or tracking position of stylus 200. In some exemplary embodiments sensor 312 includes a patterned arrangement of conductive strips or lines that are optionally arranged in a grid including row conductive strips 322 and column conductive strips 324, also referred to as antennas. In some exemplary embodiments, sensor 312 is transparent and is optionally overlaid on a flat panel display (FPD). According to some embodiments of the present invention, sensor 312 is a capacitive based sensor that simultaneous detects a stylus and one or more finger touches.

Typically, circuitry is provided on one or more printed circuit boards (PCBs) 340 positioned in proximity to touch sensor 312. One or more application specific integrated circuit (ASICs) 316 positioned on PCB 340 comprise circuitry to sample and process the sensor's output into a digital representation. Digital output is optionally forwarded to a digital unit 319, e.g. a digital ASIC unit mounted also on PCB 340, for further digital processing. Typically, output from digital unit 319 is forwarded to a host 320 via an interface 323 for processing by the operating system or any current application.

According to some embodiments, digital unit 319 also produces and sends a triggering pulse to at least one of the conductive lines, e.g. a trigger pulse with frequency of 10-300 KHz. In some exemplary embodiments, finger touch detection is facilitated when sending a triggering pulse to the conductive lines.

According to some embodiments of the invention, digital unit 319 determines and/or tracks the position of stylus 200 as well as other of physical objects, such as finger 346, and/or an electronic tag touching the digitizer sensor from the received and processed signals. According to some embodiments of the present invention, digital unit 319 determines the tip pressure applied on stylus 200 based on encoded signals transmitted by the stylus, e.g. analog encoded signals. In some exemplary embodiments of the present invention hovering of an object, e.g. stylus 200, finger 346 and hand, is also detected and processed by digital unit 319. According to some embodiments of the present invention, hovering and touching stylus is differentiated by signals transmitted by the stylus, e.g. analog encoded signals.

According to some embodiments of the present invention, digitizer system 300 includes a stylus garage 365 for storing stylus 200 while not being used. Optionally, stylus garage 365 includes a charger 367 for charging a battery of stylus 200.

Optionally, stylus 200 is powered with a wire, based in stylus garage 365 or with electrical decoupling. Optionally digitizer 300 includes an excitation coil surrounding sensor 312 for transmitting a triggering signal to stylus 200.

Typically, stylus 200 is operable to be used with a capacitive touch screen.

Optionally, stylus 200 can be added as a stand-alone product to an existing capacitive touch screen that includes circuitry that supports stylus interaction.

Digitizer systems used to detect stylus and/or finger tip location may be, for example, similar to digitizer systems described in incorporated U.S. Pat. No. 6,690,156, U.S. Pat. No. 7,292,229 and/or U.S. Pat. No. 7,372,455. Embodiments of the present invention will also be applicable to other digitizer systems known in the art, depending on their construction. Embodiments of the present invention will also be applicable to other digitizer sensors known in the art, e.g. sensors comprising loop coils.

Figures 11A, 12:
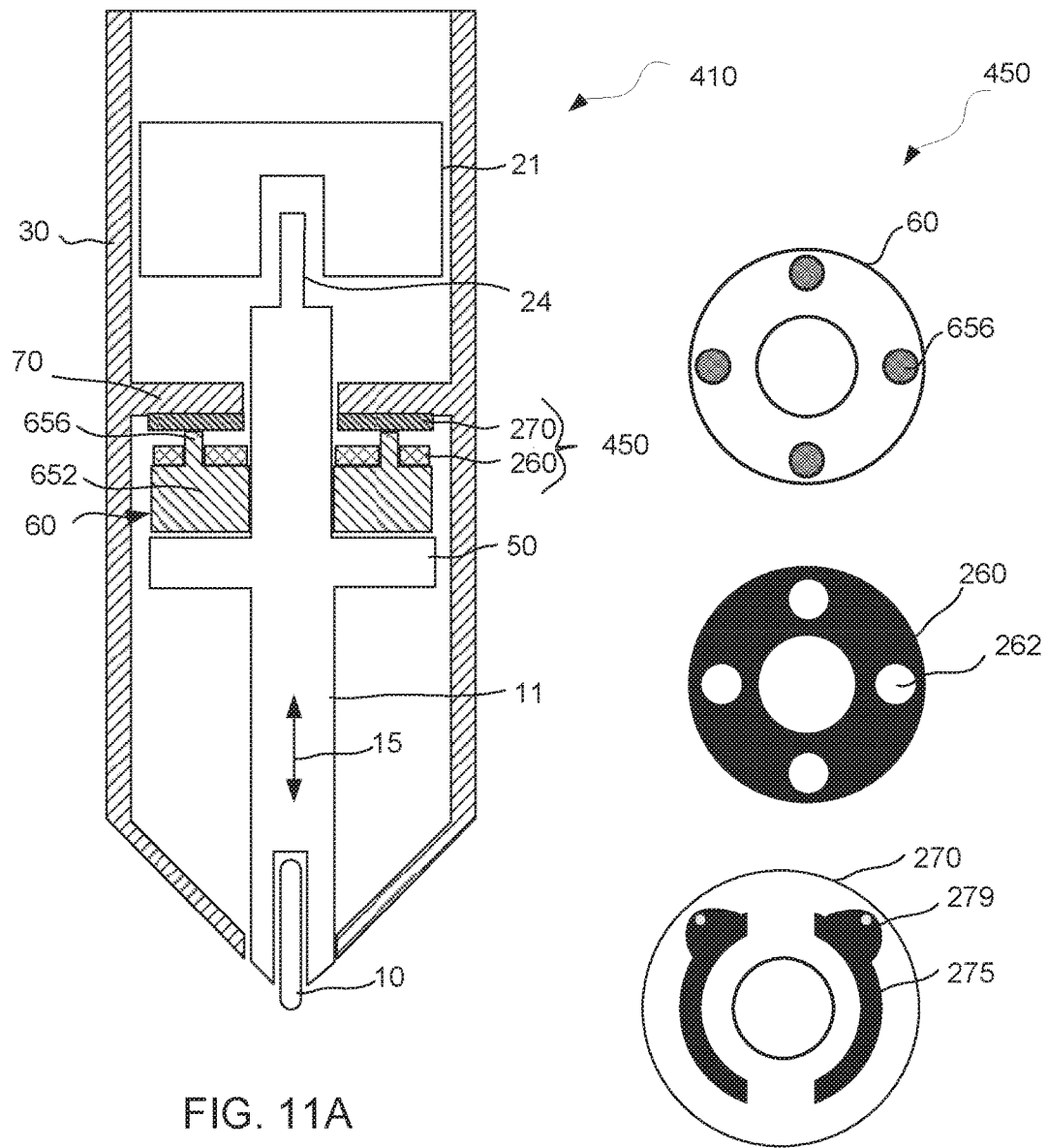
FIGS. 11A and 11B are simplified schematic drawings of an exemplary stylus including a normally open contact switch in accordance with some embodiments of the present invention.
FIG. 12 is a simplified schematic drawing of components forming the normally open contact switch in accordance with some embodiments of the present invention.
Figure 11B:
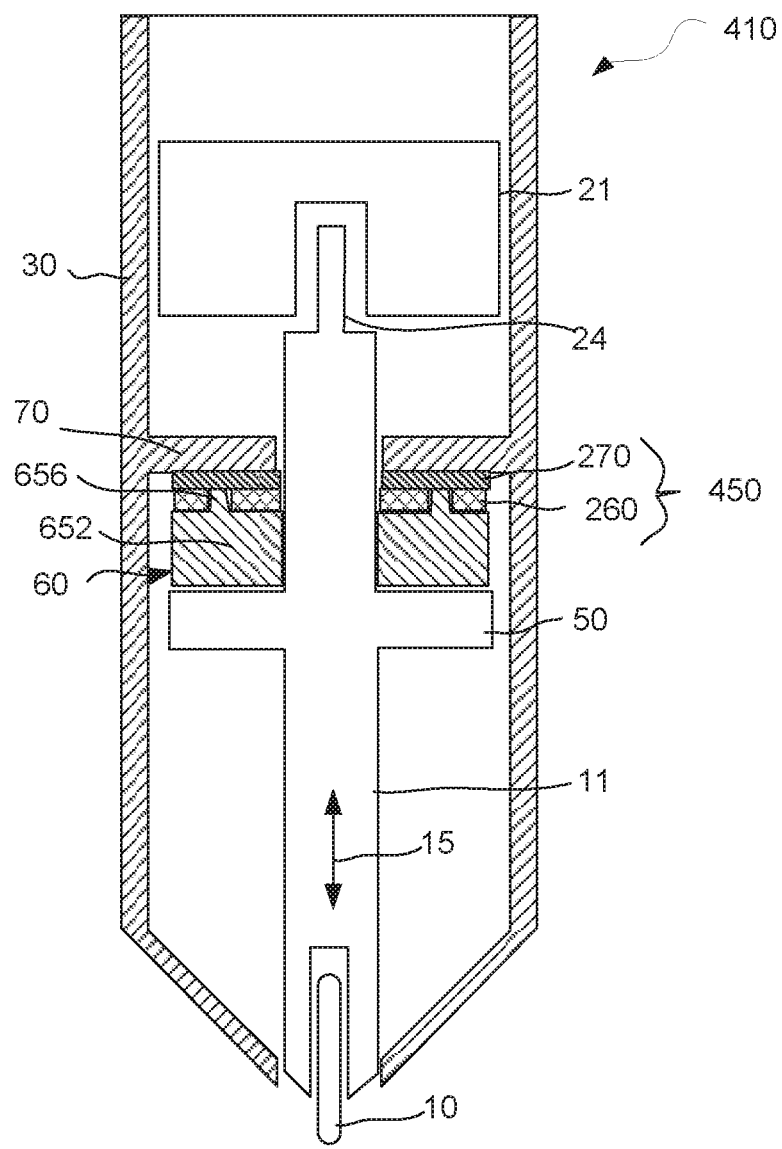

Reference is now made to FIGS. 11A and 11B showing a simplified schematic drawing of an exemplary stylus including a normally open contact switch and to FIG. 12 showing a simplified schematic drawing of components forming the normally open contact switch, all in accordance with some embodiments of the present invention.

According to some embodiments of the present invention, a stylus 410 includes a contact switch 450 formed from a conductive ring 260 and a plate 270 including at least two conductive elements 275 that are isolated from each other, each connected to a terminal 279.

According to some embodiments of the present invention, plate 270 is fixedly attached to wall 70 of housing 30 and conductive ring 260 is fitted over elastomer element 60 and moves together with elastomer element 60 and tip holder 11 in response to pressure applied on tip 10. Typically each of elastomer 60, conductive ring 260 and plate 270 are ring shaped and fit around tip holder 11. Typically, conductive ring 260 is formed from a soft conductive material that is securely fitted around tip holder 11, so that conductive ring 260 does not move in relation to tip holder 11. Optionally, conductive ring 260 is formed from conductive silicon including carbon or other conductive particles such as nano-tubes. Optionally, conductive ring 260 is formed from blend, e.g. mix of conductive material and/or conductive particles and one or more of rubber, thermoplastic polyurethane (TPU), and polyoxymethylene (POM). Optionally, conductive ring 260 is formed using double injection molding or insert molding.

Alternatively or additionally plate 270 is formed from a soft and/or pliable material.

In order to attach conductive ring 260 to base portion 652, a rigid member (not shown) may optionally be provided as part of or attached to base portion 652, which will press into conductive ring 260 and attach it to base portion 652.

According to some embodiments of the present invention, conductive ring 260 includes a plurality of openings and/or through going holes 262 and elastomer 60 is formed with bulges, prongs and/or protruding elements 656 that are matched with holes 262 and protrude through openings 262. According to some embodiments of the present invention, protruding elements 656 provide for separating conductive ring 260 from plate 270 during a hover operational mode of stylus 410 (FIG. 11A). According to some embodiments of the present invention, during a touch operational mode, protruding elements 656 collapse and/or compress against plate 270 in response to movement of tip holder 11 and conductive ring 260 comes into contact with conductive elements 275 and shorts terminals 279 (FIG. 11B). According to some embodiments of the present invention, protruding elements 656 provides a defined resilient force that prevents movement of tip holder 11 while stylus 420 is held upside down and releases contact between ring 260 and plate 270 when pressure on tip 10 is released. Typically, openings 262 are defined to be larger in diameter than protruding elements 656 to accommodate for deformation of protruding elements 656 during compression. Typically, conductive elements 275 are connected to circuitry of stylus 410, e.g. a PCB of stylus 410 and/or controller 110 (FIG. 9). According to some embodiments of the present invention, a touch operational state is defined and/or sensed in response to detecting and/or sensing a short between terminals 279.

Optionally, additional pressure applied on tip 10 compresses the base portion 652 of elastomer 60. Typically, the resilient force provided by base portion 652 is greater than that provided by protruding elements 656. Optionally movement of tip holder 11 is optically detected with tip displacement detector 21. Optionally, sensing with tip displacement detector 21 is only activated in response to sensing a pen-down state contact switch 450. Alternatively, contact switch 450 is used in place of tip displacement detector 21 and stylus 410 does not provide for monitoring different pressure levels in a touch operational mode.

Figures 13A, 14:
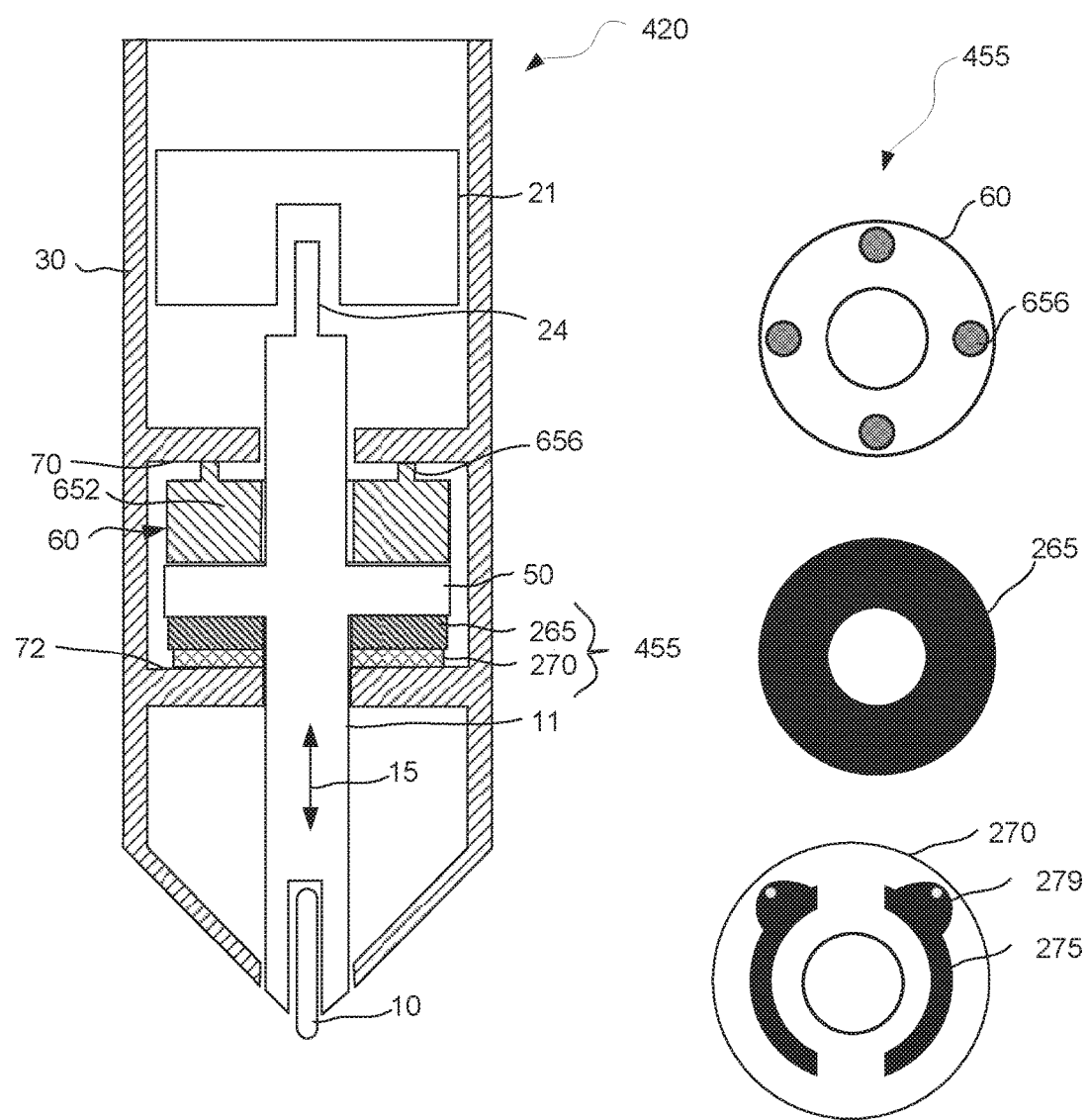
FIGS. 13A and 13B are simplified schematic drawings of an exemplary stylus including a normally closed contact switch in accordance with some embodiments of the present invention.
FIG. 14 is a simplified schematic drawing of components forming the normally closed contact switch in accordance with some embodiments of the present invention.
Figure 13B:
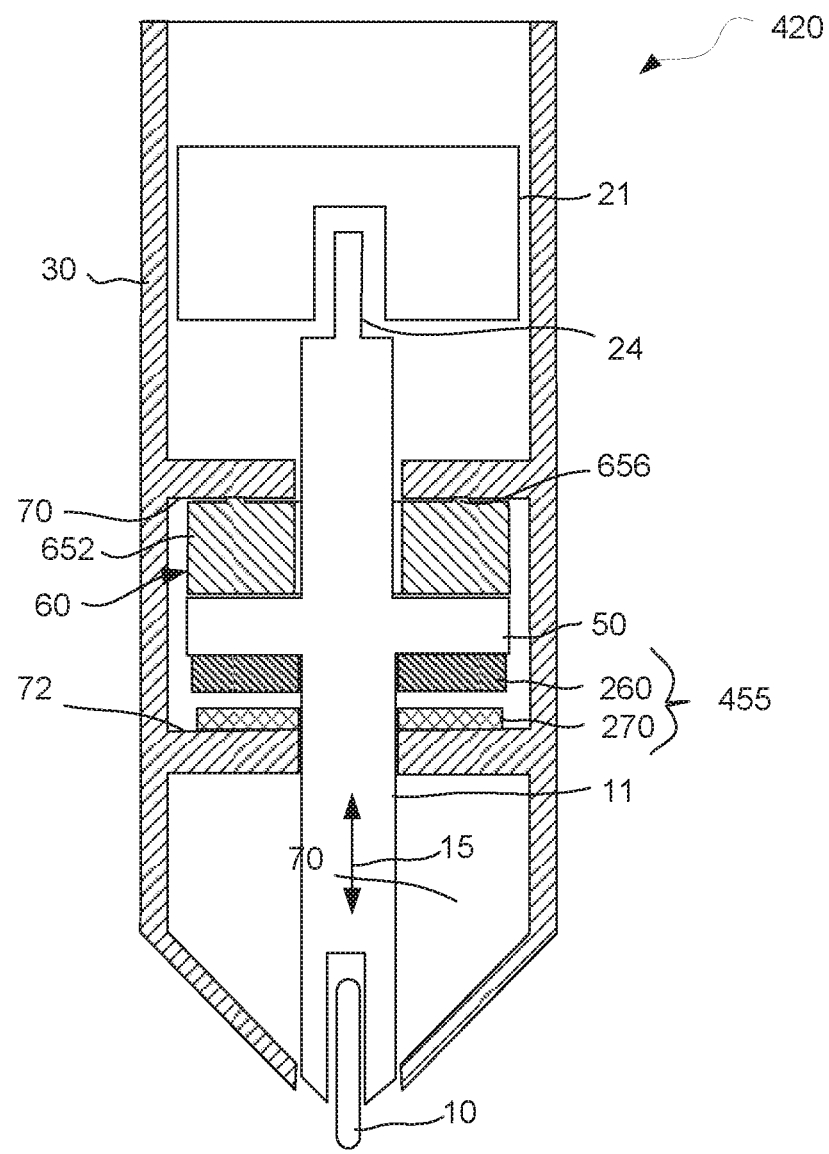

Reference is now made to FIGS. 13A and 13B showing a simplified schematic drawing of an exemplary stylus including a normally closed contact switch and to FIG. 14 showing a simplified schematic drawing of components forming the normally closed contact switch, all in accordance with some embodiments of the present invention.

According to some embodiments of the present invention, a stylus 420 includes a normally closed contact switch 455 formed from a conductive ring 265 and plate 270 including at least two conductive elements 275 that are isolated from each other each connected to a terminal 279.

According to some embodiments of the present invention, plate 270 is fixedly attached to wall 72 of housing 30 and conductive ring 265 is securely fitted around tip holder 11, so that ring 260 moves together with tip holder 11 but does not move in relation to tip holder 11. Typically, conductive ring 260 is formed from a soft conductive material. Optionally, conductive ring 260 is formed from conductive silicon including carbon or other conductive particles such as nano-tubes. Optionally, conductive ring 260 is formed from blend, e.g. mix of conductive material and/or conductive particles and one or more of rubber, thermoplastic polyurethane (TPU), and polyoxymethylene (POM).

According to some embodiments of the present invention, elastomer 60 is formed with a protruding element 655 in the form of a ring that faces and touches wall 70 of housing 30. Optionally, elastomer element 60 includes a plurality of protruding elements 656. Optionally, elastomer element 60 is flat so that the base 652 is compressed in response to applied pressure, e.g. elastomer element 60 does not include protruding elements 656.

According to some embodiments of the present invention, in response to pressure applied on tip 10, protruding elements 656 are pushed up against wall 70 and are compressed and tip holder 11 is displaced. Typically, compression of protruding elements 656 provides a resilient force against pressure applied on tip 10. According to some embodiments of the present invention, displacement of tip holder 11 during a touch operational mode of the stylus separates conductive ring 265 from plate 270 opens contact switch 455, e.g. terminals 279. Typically, conductive elements 275 are connected to circuitry of stylus 420, e.g. a PCB of stylus 420 and/or controller 110 (FIG. 9). According to some embodiments of the present invention, a touch operational state is defined and/or sensed in response to detecting and/or an open state of contact witch 455.

Optionally, additional pressure applied on tip 10 compresses the base portion 652 of elastomer 60. Optionally movement of tip holder 11 is optically detected with tip displacement detector 21. Optionally, sensing with tip displacement detector 21 is only activated in response to sensing a pen-down state with contact switch 455.

Alternatively, contact switch 455 is used in place of tip displacement detector 21 stylus 420 does not provide for monitoring different pressure levels in a touch operational mode.

It is noted that the method for assembling a tip pressure detecting system as described herein can be similarly applied to stylus 410 and 420.

It will be appreciated that the two-state switch described above may be used with or without pressure monitoring mechanism. It may also be used for controlling different power modes and different operation modes of the stylus, such that when no touch is sensed, the stylus is in power save (sleep) mode, and wakes up upon touch where pressure is applied on the tip. The different modes can also be used for changing report rate or report content between hover and tip.

In alternative embodiments, the switch may be implemented as a capacitive switch including two conductive layers separated by an air gap where at least one of the layers is covered and/or laminated with a thin non-conductive layer having high dielectric coefficient. When there is an air gap between the two conductive layers, such as when no pressure is applied, the dielectric coefficient drops and the capacitance drops due to the dielectric coefficient and the distance between the layers. This provides for significant difference in capacities and therefore discriminating between the states of pressure and no pressure. Optionally, one of the conductive layers is elastomer element 60 and/or is integral to elastomer element 60. Optionally protruding elements 656 define the air gap between the conductive layers.

The terms "comprises", "comprising", "includes", "including", "having" and their conjugates mean "including but not limited to".

As used herein, the singular form "a", "an" and "the" include plural references unless the context clearly dictates otherwise.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A pressure sensitive stylus for operation with a digitizer sensor comprising:
    a housing;
    a writing tip that is movable and recedes toward the housing of the stylus in response to contact pressure applied on the writing tip;
    an extremity that is movable together with the writing tip;
    a switch comprising:
        a first element that is fixed to the extremity;
        a second element that is fixed to the housing, wherein the first element and second element are conductive and physical contact between the first element and the second element initiates electrical communication and toggles the switch;
        a third element that is fixed to the housing;
        a controller configured to detect the electrical communication; and
        an resilient element positioned around the extremity, the resilient element including a base surface and at least one protruding surface extending from the base surface, wherein the at least one protruding surface maintains physical contact with the third element during toggling of the switch, and wherein the base surface is configured to move with respect to the third element during the toggling,
    wherein the resilient element is configured to compress against the third element based on the contact pressure applied on the writing tip; and
    wherein the switch is configured to toggle at a pre-defined compressed state of the resilient element.

2. The pressure sensitive stylus of claim 1, wherein toggling of the switch defines a transition between a hover operational state and a touch operational state of the stylus.

3. The pressure sensitive stylus of claim 1, wherein toggling of the switch defines a transition between a sleep mode and an active mode of the stylus.

4. The pressure sensitive stylus of claim 1, wherein the switch is operable to alter at least one of a repetition rate, a duty cycle and a power state of the stylus.

5. The pressure sensitive stylus of claim 1, comprising:
    a transmitting unit for transmitting the operational state of the stylus to a digitizer sensor that is operated together with the stylus.

6. The pressure sensitive stylus of claim 1, wherein the second element includes two terminals and wherein contact between the first element and the second element shorts the two terminals.

7. The pressure sensitive stylus of claim 1, wherein the first element or the second element is formed from a conductive material that is pliable.

8. The pressure sensitive stylus of claim 7, wherein the first element or the second element is formed from conductive particles embedded in at least one of silicon, rubber, thermoplastic polyurethane and polyoxymethylene.

9. The pressure sensitive stylus of claim 1, wherein the resilient element is integral to the first element or the second element.

10. The pressure sensitive stylus of claim 1, wherein the switch is operative to toggle in response to the at least one protruding element resiliently collapsing due to the resilient element compressing against the third element.

11. The pressure sensitive stylus of claim 1, wherein the switch is a normally closed switch, and wherein the first and second element of the switch is separated responsive to the writing tip receding toward the housing of the stylus.

12. The pressure sensitive stylus of claim 1, wherein the switch is a normally open switch, and wherein the first and second element of the switch is brought into contact responsive to the writing tip receding toward the housing of the stylus.

13. The pressure sensitive stylus of claim 12, wherein the first element includes a plurality of through going holes and the at least one protruding element includes a plurality of protruding elements and wherein the plurality of through going holes are configured to match the plurality of protruding elements, and wherein the first element is fitted on the resilient element so that the plurality of protruding elements protrude through the plurality of through going holes.

14. The pressure sensitive stylus of claim 13, wherein the second element and the third element are a common element and wherein the plurality of protruding elements are positioned to physically contact the second element of the switch and are sized to separate the first element of the switch from the second element of the switch over a pre-defined displacement of the writing tip associated with a hover operational state of the stylus.

15. The pressure sensitive stylus of claim 1, wherein the first element comprises a first conductive layer and the second element comprises a second conductive layer such that the first and second conductive layers face each other, wherein a first conductive layer is laminated with a non-conductive layer having a defined dielectric coefficient, and wherein during an open state of the switch a dielectric coefficient of an air gap that forms between the non-conductive layer and the second conductive layer dominates a combined dielectric coefficient of the air gap and non-conductive layer.

16. The pressure sensitive stylus of claim 15, wherein the controller is configured to detect changes in capacitance in the switch responsive to movement of the writing tip.

17. The pressure sensitive stylus of claim 1, comprising:
a displacement monitor operative to monitor displacements of the writing tip over a range of displacements;
a controller operative to sample output from the displacement monitor, wherein the range of displacements is a range corresponding to a touch operational mode of the stylus; and
a transmitting unit operative to transmit information associated with the output sampled to a digitizer sensor operated together with the stylus, wherein at least one of sampling output from the displacement monitor and transmitting information associated with the output sampled is responsive toggle state of the switch.

18. The pressure sensitive stylus of claim 1, wherein the base surface of the resilient element is shaped as a flat ring.

19. The pressure sensitive stylus of claim 1, comprising:
a sleeve element movable between two partitions formed as part of the housing, wherein the extremity is fitted through the sleeve element and fixedly connect to the sleeve element so that tip movement is confined by movement of the sleeve element.

20. A pressure sensitive stylus for operation with a digitizer sensor comprising:
a housing;
a writing tip that is movable and recedes toward the housing of the stylus in response to contact pressure applied on the writing tip;
an extremity that is movable together with the writing tip;
a switch comprising:
a first conductive layer fixedly positioned on an element positioned around the extremity; and
a second conductive layer facing the first conductive layer, wherein the second conductive layer is fixed to the housing;
wherein one of the first conductive layer and the second conductive layer is laminated with a non-conductive material; and
an resilient element including a base surface and one or more protruding surfaces extending from the base surface;
wherein one of the first conductive layer and the second conductive layer is integrated with the base surface and wherein the one or more protruding surfaces extend from the base surface and toward the other one of the first conductive layer and the second conductive layer and is in physical contact with the other one of the first conductive layer and the second conductive layer while the switch is open and closed; and
a controller configured to detect electrical communication between the first conductive layer and the second conductive layer; and
wherein physical contact between the first conductive layer and the second layer responsive to compression of the resilient element closes the switch, wherein the physical contact is detected by the controller as a change in capacitance due to an absence of an air gap between the first and second layer.

* * * * *